US012293703B2

(12) United States Patent
Kim et al.

(10) Patent No.: US 12,293,703 B2
(45) Date of Patent: May 6, 2025

(54) SCAN DRIVER HAVING A NODE CONTROL CIRCUIT IN RESPONSE TO CARRY SIGNAL, ENABLE SIGNAL, AND VOLTAGE OF INVERTED CARRY NODE AND DISPLAY DEVICE INCLUDING THE SAME

(71) Applicant: Samsung Display Co., LTD., Yongin-si (KR)

(72) Inventors: Kyungho Kim, Yongin-si (KR); Gichang Lee, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/369,350

(22) Filed: Sep. 18, 2023

(65) Prior Publication Data

US 2024/0265847 A1 Aug. 8, 2024

(30) Foreign Application Priority Data

Feb. 7, 2023 (KR) ........................ 10-2023-0016339

(51) Int. Cl.
*G09G 3/32* (2016.01)

(52) U.S. Cl.
CPC ....... *G09G 3/32* (2013.01); *G09G 2300/0819* (2013.01); *G09G 2300/0852* (2013.01); *G09G 2310/0267* (2013.01); *G09G 2330/021* (2013.01)

(58) Field of Classification Search
CPC ............ G09G 3/32; G09G 2300/0819; G09G 2300/0852; G09G 2310/0267; G09G 2330/021; G09G 3/3674; G09G 3/3266; G09G 3/3677; G11C 19/28
See application file for complete search history.

(56) References Cited

U.S. PATENT DOCUMENTS

| | | | | |
|---|---|---|---|---|
| 11,423,843 | B2 | 8/2022 | Kim et al. | |
| 2021/0193048 | A1* | 6/2021 | Lim | G09G 3/3677 |
| 2022/0383821 | A1* | 12/2022 | No | G09G 3/3266 |
| 2023/0351972 | A1* | 11/2023 | In | G09G 3/3266 |
| 2023/0377504 | A1* | 11/2023 | In | G09G 3/3674 |
| 2024/0062705 | A1* | 2/2024 | In | G11C 19/28 |

* cited by examiner

*Primary Examiner* — Richard J Hong
(74) *Attorney, Agent, or Firm* — CANTOR COLBURN LLP

(57) ABSTRACT

A scan driver includes: stages. Each stage includes: a first node control circuit for controlling a voltage of a first node; an inverted carry node control circuit for controlling a voltage of an inverted carry node; a carry output circuit for outputting a carry signal; a fourth node control circuit for controlling a voltage of a fourth node in response to the carry signal; a second node control circuit for controlling a voltage of a second node in response to the carry signal, an enable signal, and the voltage of the inverted carry node; a third node control circuit for controlling a voltage of a third node in response to the voltage of the second node and the voltage of the fourth node; and a scan output circuit for outputting a scan signal in response to the voltage of the third node and the voltage of the fourth node.

20 Claims, 15 Drawing Sheets

SCAN DRIVER HAVING A NODE CONTROL CIRCUIT IN RESPONSE TO CARRY SIGNAL, ENABLE SIGNAL, AND VOLTAGE OF INVERTED CARRY NODE AND DISPLAY DEVICE INCLUDING THE SAME

This application claims priority to Korean Patent Application No. 10-2023-0016339 filed on Feb. 7, 2023, and all the benefits accruing therefrom under 35 U.S.C. § 119, the content of which in its entirety is herein incorporated by reference.

BACKGROUND

1. Field

Embodiments relate to a display device. More particularly, embodiments related to a scan driver applied to a display device that performs a multi frequency driving in variable areas, and a display device including the scan driver.

2. Description of the Related Art

It is desirable to reduce power consumption of a display device, and particularly, it is desirable to reduce power consumption of a display device included in a mobile device such as a smart phone, a tablet computer, or the like. In order to reduce power consumption of the display device, a low frequency driving technology for driving or refreshing a display panel at a low driving frequency lower than a normal driving frequency has been developed.

In a conventional display device to which the low frequency driving technology is applied, when a still image is not displayed on an entire area of the display panel, that is, when the still image is displayed only on a partial area of the display panel, the entire area of the display panel may be driven at the normal driving frequency. Accordingly, the low frequency driving may not be performed and power consumption of the display device may not be reduced.

SUMMARY

Embodiments provide a scan driver that provides scan signals with different frequencies to variable areas of a display panel.

Embodiments provide a display device including the scan driver.

A scan driver according to embodiments includes: a plurality of stages. Each of the plurality of stages includes: a first node control circuit which controls a voltage of a first node in response to an input signal, a first clock signal, and a second clock signal; an inverted carry node control circuit which controls a voltage of an inverted carry node in response to the voltage of the first node; a carry output circuit which outputs a carry signal in response to the voltage of the inverted carry node; a fourth node control circuit which controls a voltage of a fourth node in response to the carry signal; a second node control circuit which controls a voltage of a second node in response to the carry signal, an enable signal, and the voltage of the inverted carry node; a third node control circuit which controls a voltage of a third node in response to the voltage of the second node and the voltage of the fourth node; and a scan output circuit which outputs a scan signal in response to the voltage of the third node and the voltage of the fourth node.

In an embodiment, each of the carry signal and the scan signal may be an active high signal having a high level as an active level.

In an embodiment, the second node control circuit may control the voltage of the second node as a low level when the enable signal has a high level before the carry signal having the high level is output. The third node control circuit may control the voltage of the third node as the low level in response to the voltage of the second node having the low level while the carry signal having the high level is output. The scan output circuit may output the scan signal having the high level in response to the voltage of the third node having the low level while the carry signal having the high level is output.

In an embodiment, the second node control circuit may maintain the voltage of the second node as the low level until the carry signal having the high level is terminated when the enable signal changes from the high level to the low level while the carry signal having the high level is output.

In an embodiment, the second node control circuit may control the voltage of the second node as a high level when the enable signal has a low level before the carry signal having the high level is output. The third node control circuit may control the voltage of the third node as the high level in response to the voltage of the second node having the high level while the carry signal having the high level is output. The scan output circuit may output the scan signal having the low level in response to the voltage of the third node having the high level while the carry signal having the high level is output.

In an embodiment, the second node control circuit may maintain the voltage of the second node as the high level until the carry signal having the high level is terminated when the enable signal changes from the low level to the high level while the carry signal having the high level is output.

In an embodiment, the second node control circuit may maintain the voltage of the second node as a previous level while the carry signal having a high level and the voltage of the inverted carry node having a low level are output.

In an embodiment, the second node control circuit may control the voltage of the second node as a low level when the carry signal having a high level is not output and the enable signal has the high level. The second node control circuit may control the voltage of the second node as the high level when the carry signal having the high level is not output and the enable signal has the low level.

In an embodiment, the second node control circuit may include ninth and tenth transistors connected in series between a high gate voltage line and the second node, and eleventh and twelfth transistors connected in series between the second node and a low gate voltage line. The ninth transistor may be turned-on in response to the carry signal. The tenth transistor may be turned-on in response to the enable signal having a low level. The eleventh transistor may be turned-on in response to the enable signal having a high level. The twelfth transistor may be turned-on in response to the voltage of the inverted carry node.

In an embodiment, the second node control circuit may further include a second capacitor connected between the second node and the low gate voltage line.

In an embodiment, the third node control circuit may separate the third node from the fourth node when the voltage of the second node has a high level. The third node control circuit may connect the third node to the fourth node when the voltage of the second node has a low level.

In an embodiment, the fourth node control circuit may include a seventh transistor connected between a high gate voltage line and the fourth node and which includes a gate for receiving the carry signal, and an eighth transistor connected between the fourth node and a low gate voltage line and which includes a gate for receiving the carry signal.

In an embodiment, the carry output circuit may include a fifth transistor connected between a high gate voltage line and a carry output node for outputting the carry signal and which includes a gate connected to the inverted carry node, and a sixth transistor connected between the carry output node and a low gate voltage line and which includes a gate connected to the inverted carry node.

In an embodiment, the scan output circuit may include a fifteenth transistor connected between a high gate voltage line and a scan output node for outputting the scan signal and which includes a gate connected to the third node, and a sixteenth transistor connected between the scan output node and a low gate voltage line and which includes a gate connected to the fourth node.

In an embodiment, each of the first node control circuit, the inverted carry node control circuit, the carry output circuit, the fourth node control circuit, the second node control circuit, the third node control circuit, and the scan output circuit may include at least one P-type transistor and at least one N-type transistor.

A scan driver according to embodiments includes: a plurality of stages. Each of the plurality of stages includes: a first node control circuit which controls a voltage of a first node in response to an input signal, a first clock signal, and a second clock signal; an inverted carry node control circuit which controls a voltage of an inverted carry node in response to the voltage of the first node; a carry output circuit which outputs a carry signal in response to the voltage of the inverted carry node; a second node control circuit which controls a voltage of a second node in response to the voltage of the inverted carry node, an enable signal, and the carry signal; a third node control circuit which controls a voltage of a third node in response to the voltage of the second node and the carry signal; and a scan output circuit which outputs a scan signal in response to the voltage of the third node and the voltage of the carry signal.

In an embodiment, the carry signal may be an active low signal having a low level as an active level. The scan signal may be an active high signal having a high level as the active level.

A display device according to embodiments includes: a display panel which includes a plurality of pixels; a data driver which provides a data signal to each of the plurality of pixels; and a scan driver which provides a scan signal to each of the plurality of pixels and includes a plurality of stages. Each of the plurality of stages includes: a first node control circuit which controls a voltage of a first node in response to an input signal, a first clock signal, and a second clock signal; an inverted carry node control circuit which controls a voltage of an inverted carry node in response to the voltage of the first node; a carry output circuit which outputs a carry signal in response to the voltage of the inverted carry node; a fourth node control circuit which controls a voltage of a fourth node in response to the carry signal; a second node control circuit which controls a voltage of a second node in response to the carry signal, an enable signal, and the voltage of the inverted carry node; a third node control circuit which controls a voltage of a third node in response to the voltage of the second node and the voltage of the fourth node; and a scan output circuit which outputs a scan signal in response to the voltage of the third node and the voltage of the fourth node.

In an embodiment, each of the plurality of pixels may include: a light emitting diode; a driving transistor connected between a first pixel node and a second pixel node and which controls a driving current provided to the light emitting diode in response to a voltage of a third pixel node; a write transistor connected between a data line for transmitting the data signal and the first pixel node and turned-on in response to a write gate signal; a compensation transistor connected between the second pixel node and the third pixel node and turned-on in response to a compensation gate signal; and an initialization transistor connected between an initialization voltage line for transmitting an initialization voltage and the third pixel node and turned-on in response to an initialization gate signal.

In an embodiment, the scan signal may be the compensation gate signal or the initialization gate signal.

In the scan driver and the display device according to the embodiments, each of the stages of the scan driver may selectively output the scan signal in response to the enable signal, so that the scan driver may provide the scan signals with different driving frequencies to variable areas of a display panel, and power consumption of the display device may be effectively reduced.

BRIEF DESCRIPTION OF THE DRAWINGS

Illustrative, non-limiting embodiments will be more clearly understood from the following detailed description taken in conjunction with the accompanying drawings.

DETAILED DESCRIPTION

Figure 1:
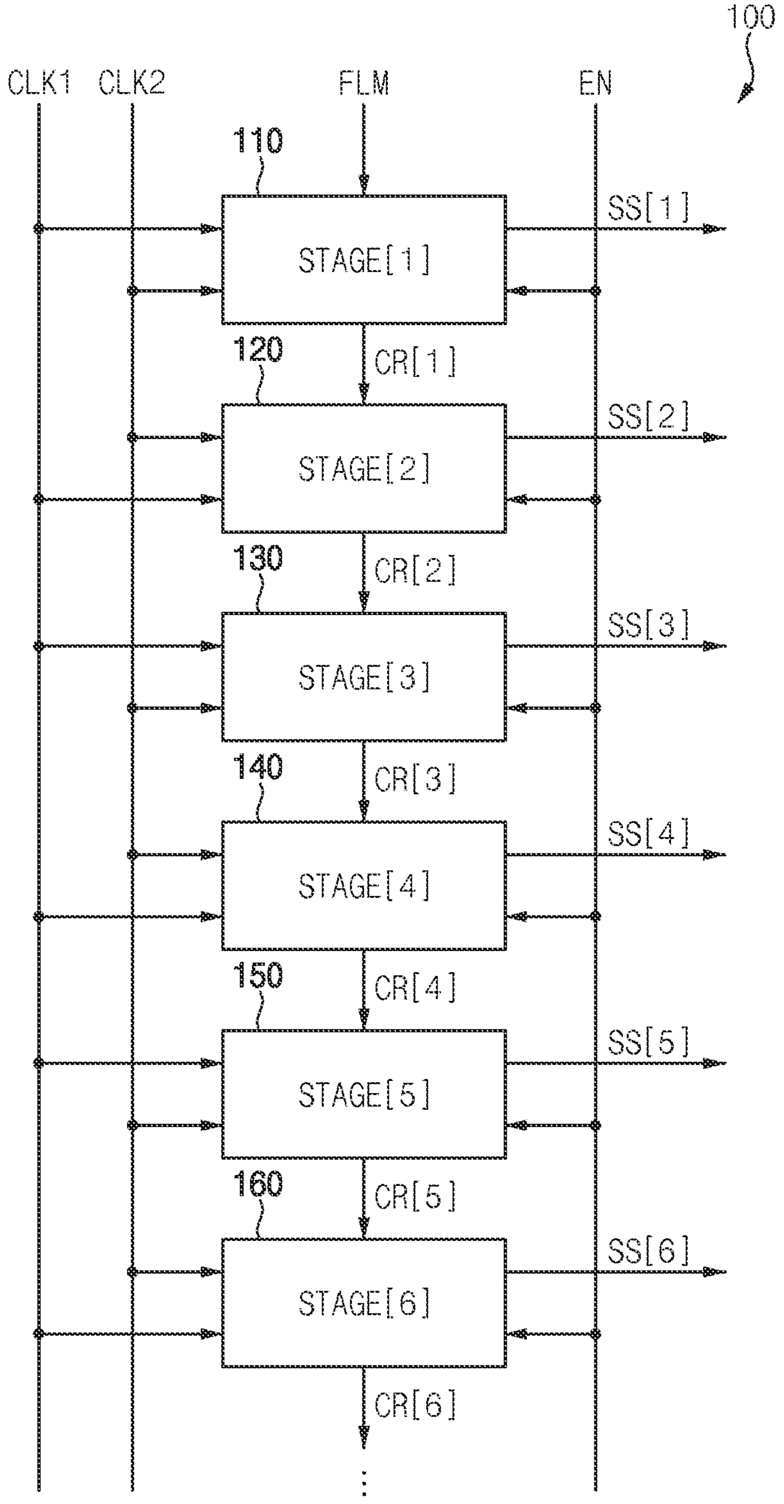
FIG. 1 is a block diagram illustrating a scan driver according to an embodiment.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Hereinafter, a scan driver and a display device according to embodiments of the present disclosure will be described in more detail with reference to the accompanying drawings. The same or similar reference numerals will be used for the same elements in the accompanying drawings.

Figure 2:
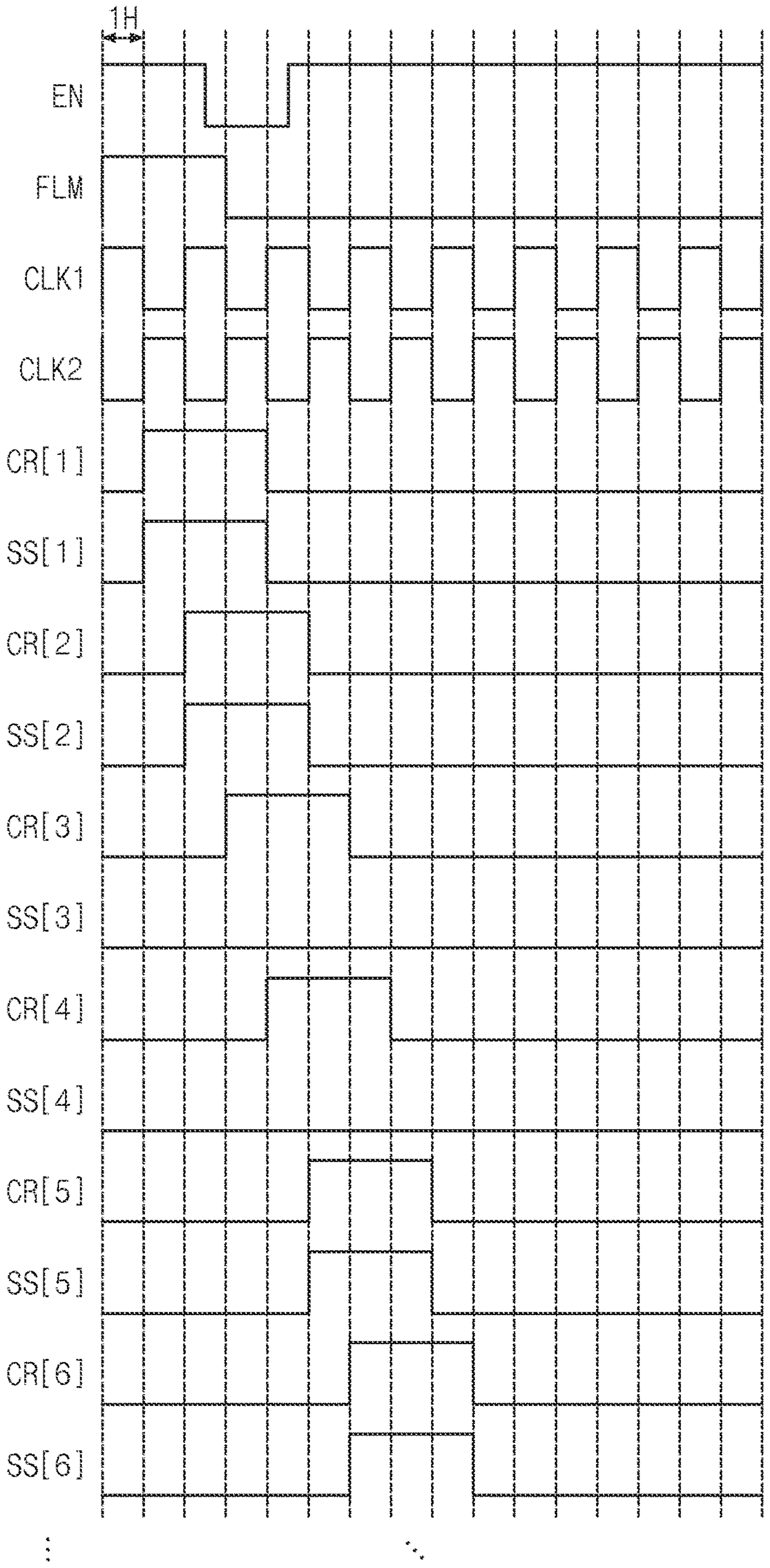
FIG. 2 is a timing diagram illustrating input signals and output signals of the scan driver in FIG. 1.

FIG. 1 is a block diagram illustrating a scan driver 100 according to an embodiment. FIG. 2 is a timing diagram illustrating input signals and output signals of the scan driver 100 in FIG. 1.

Referring to FIGS. 1 and 2, the scan driver 100 may include a plurality of stages 110, 120, 130, 140, 150, 160, . . . .

The plurality of stages 110, 120, 130, 140, 150, 160, . . . may receive a first clock signal CLK1, a second clock signal CLK2, a scan-start signal FLM, and an enable signal EN. The first clock signal CLK1 and the second clock signal CLK2 may have different phases. In an embodiment, as illustrated in FIG. 2, the first clock signal CLK1 and the second clock signal CLK2 may have opposite phases. In an embodiment, for example, the second clock signal CLK2 may be a signal obtained by shifting the first clock signal CLK1 by one horizontal time (1H).

The plurality of stages 110, 120, 130, 140, 150, 160, . . . may sequentially generate carry signals CR[1], CR[2], CR[3], CR[4], CR[5], CR [6], . . . . In an embodiment, odd-numbered stages 110, 130, 150, . . . may receive an input signal (e.g., the scan-start signal FLM or previous carry signals CR[2], CR[4], . . . ) having a high level in response to the first clock signal CLK1 having the high level and the second clock signal CLK2 having a low level, and may initiate output of carry signals CR[1], CR[3], CR[5], . . . having the high level. Further, even-numbered stages 120, 140, 160, . . . may receive an input signal (e.g., previous carry signals CR[1], CR[3], CR[5], . . . ) having the high level in response to the first clock signal CLK1 having the low level and the second clock signal CLK2 having the high level, and may initiate output of carry signals CR[2], CR[4], CR[6], . . . having the high level.

In an embodiment, for example, as illustrated in FIG. 2, the first stage STAGE[1], 110 may receive the scan-start signal FLM in response to the first clock signal CLK1 having the high level and the second clock signal CLK2 having the low level, and may initiate output of the first carry signal CR[1] having the high level. The second stage STAGE[2], 120 may receive the first carry signal CR[1] in response to the first clock signal CLK1 having the low level and the second clock signal CLK2 having the high level, and may initiate output of the second carry signal CR[2] having the high level. The third stage STAGE[3], 130 may receive the second carry signal CR[2] in response to the first clock signal CLK1 having the high level and the second clock signal CLK2 having the low level, and may initiate output of the third carry signal CR[3] having the high level. The fourth stage STAGE[4], 140 may receive the third carry signal CR[3] in response to the first clock signal CLK1 having the low level and the second clock signal CLK2 having the high level, and may initiate output of the fourth carry signal CR[4] having the high level. The fifth stage STAGE[5], 150 may receive the fourth carry signal CR[4] in response to the first clock signal CLK1 having the high level and the second clock signal CLK2 having the low level, and may initiate output of the fifth carry signal CR[5] having the high level. The sixth stage STAGE[6], 160 may receive the fifth carry signal CR[5] in response to the first clock signal CLK1 having the low level and the second clock signal CLK2 having the high level, and may initiate output of the sixth carry signal CR[6] having the high level.

In an embodiment, each of the carry signals CR[1], CR[2], CR[3], CR[4], CR[5], CR[6], . . . may be an active high signal having the high level as an active level, and an active period of each of the carry signals CR[1], CR[2], CR[3], CR[4], CR[5], CR[6], . . . may have a time length longer than 1 horizontal time (1H). Accordingly, active periods of adjacent carry signals (e.g., the first to third carry signals CR[1], CR[2], and CR[3]) may overlap each other. In FIG. 2, an example in which the active period of each of the carry signals CR[1], CR[2], CR[3], CR[4], CR[5], CR[6], . . . has a time length corresponding to 3 horizontal times is illustrated, but the active period of each of the carry signals CR[1], CR[2], CR[3], CR[4], CR[5], CR[6], . . . may have a time length corresponding to any horizontal times.

The plurality of stages 110, 120, 130, 140, 150, 160, . . . may selectively output scan signals SS[1], SS[2], SS[3], SS[4], SS[5], SS[6], . . . according to a level of the enable signal EN. In an embodiment, each of the stages (e.g., the first stage 110) may output a scan signal (e.g., the first scan signal SS[1]) having the same phase as the carry signal when the enable signal EN has the high level when starting to output a carry signal (e.g., the first carry signal CR[1]) having the high level. Although the enable signal EN is changed from the high level to the low level while the carry signal having the high level is output, the stage may continue output of the scan signal having the high level until the output of the carry signal having the high level is terminated. Further, each of the stages (e.g., the third stage 130) may not output a scan signal having the high level when the enable signal EN has the low level when starting to output a carry signal having the high level. Although the enable signal EN is changed from the low level to the high level while the carry signal having the high level is output, the stage may not output the scan signal having the high level.

In an embodiment, for example, as illustrated in FIG. 2, when the enable signal EN has the high level when starting to output the first carry signal CR[1] having the high level and starting to output the second carry signal CR[2] having the high level, the first stage STAGE[1], 110 and the second stage STAGE[2], 120 may sequentially output the first scan signal SS[1] having the high level and the second scan signal SS[2] having the high level, respectively. Although the enable signal EN is changed from the high level to the low level while the first and second carry signals CR[1] and CR[2] are output, the first stage STAGE[1], 110 may continue output of the first scan signal SS[1] having the high level until the output of the first carry signal CR[1] having the high level is terminated, and the second stage STAGE[2], 120 may continue output of the second scan signal SS[2] having the high level until the output of the second carry signal CR[2] having the high level is terminated. Further, when the enable signal EN has the low level when starting to output the third carry signal CR[3] having the high level and starting to output the fourth carry signal CR[4] having the high level, the third stage STAGE[3], 130 and the fourth stage STAGE[4], 140 may not output the third scan signal SS[3] having the high level and the fourth scan signal SS[4] having the high level, respectively. Although the enable signal EN is changed from the low level to the high level while the third and fourth carry signals CR[3] and CR[4] are output, the third stage STAGE[3], 130 and the fourth stage STAGE[4], 140 may not output the third scan signal SS[3] having the high level and the fourth scan signal SS[4] having the high level, respectively. Further, when the enable signal EN has the high level when starting to output the fifth carry signal CR[5] having the high level and starting to output the sixth carry signal CR[6] having the high level, the fifth stage STAGE[5], 150 and the sixth stage STAGE[6], 160 may sequentially output the fifth scan signal SS[5] having the high level and the sixth scan signal SS[6] having the high level, respectively.

In an embodiment, as illustrated in FIG. 2, each of the scan signals SS[1], SS[2], SS[3], SS[4], SS[5], SS[6], . . . may be an active high signal having the high level as an active level, and an active period of each of the scan signals SS[1], SS[2], SS[3], SS[4], SS[5], SS[6], . . . may have a time length longer than 1 horizontal time (1H). Accordingly, active periods of adjacent scan signals (e.g., the first and second scan signals SS[1] and SS[2]) may overlap. In FIG. 2, an example in which the active period of each of the scan signals SS[1], SS[2], SS[3], SS[4], SS[5], SS[6], . . . has a time length corresponding to 3 horizontal times is illustrated, but the active period of each of the scan signals SS[1], SS[2], SS[3], SS[4], SS[5], SS[6], . . . may have a time length corresponding to any horizontal times.

As described above, the plurality of stages 110, 120, 130, 140, 150, 160, . . . may selectively output the scan signals SS[1], SS[2], SS[3], SS[4], SS[5], SS[6], . . . according to the level of the enable signal EN, so that the scan driver 100 may provide the scan signals SS[1], SS[2], SS[3], SS[4], SS[5], SS[6], . . . with different driving frequencies to areas of a display panel.

Further, as described above, when the enable signal EN has the high level when starting to output a corresponding carry signal, although the enable signal EN is changed to the low level during the output of the corresponding carry signal, each of the stages 110, 120, 130, 140, 150, 160, . . . may output the scan signal whose active period has a time length corresponding to two or more horizontal times. Further, when the enable signal EN has the low level when starting to output a corresponding carry signal, although the enable signal EN is changed to the high level during the output of the corresponding carry signal, each of the stages 110, 120, 130, 140, 150, 160, . . . may not output the scan signal having the high level. Accordingly, the scan driver 100 may selectively provide the scan signals SS[1], SS[2], SS[3], SS[4], SS[5], SS[6], . . . whose active period has a time length corresponding to two or more horizontal times.

Figure 3:
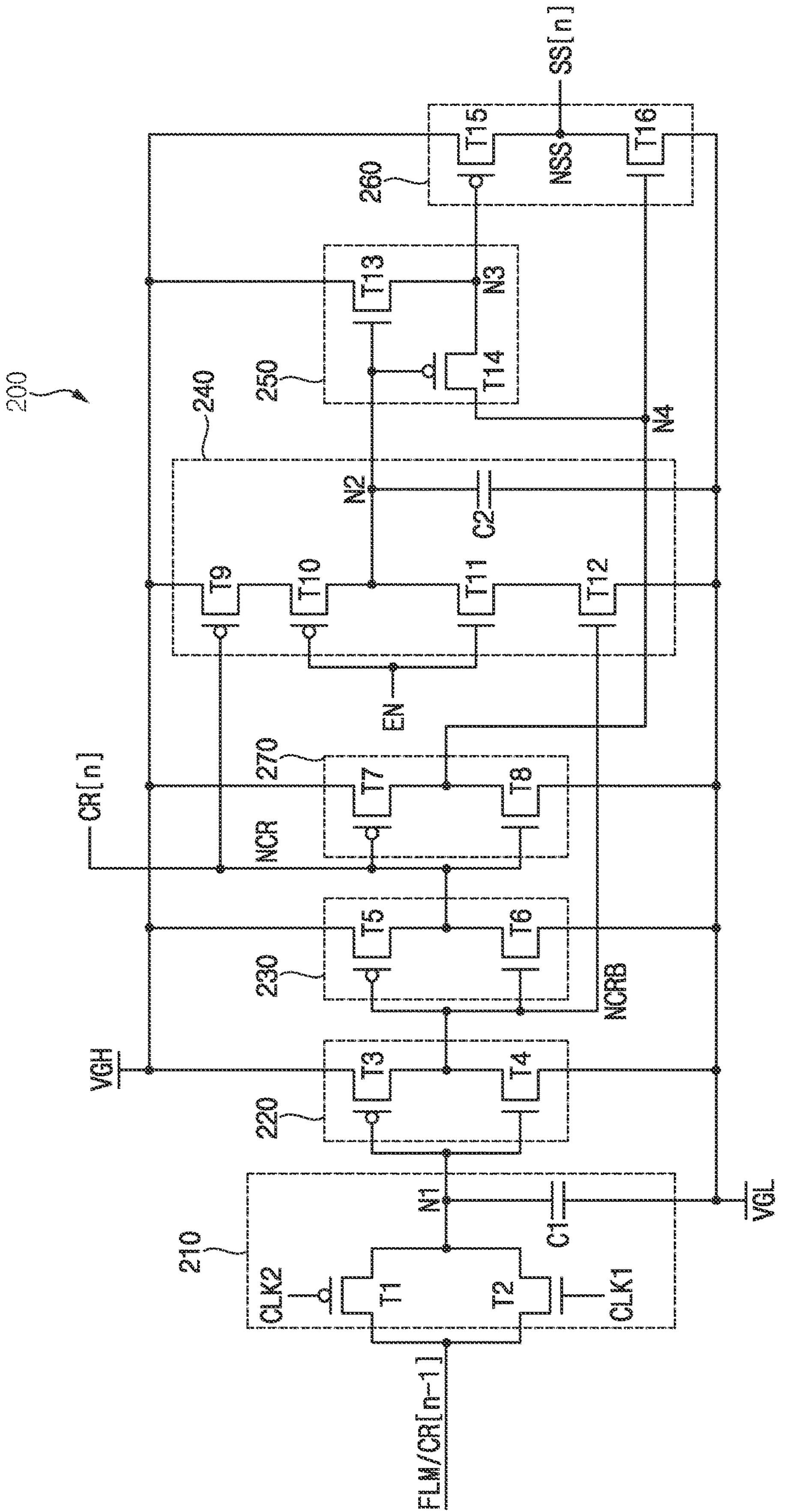
FIG. 3 is a circuit diagram illustrating a stage included in the scan driver in FIG. 1.

FIG. 3 is a circuit diagram illustrating a stage 200 included in the scan driver 100 in FIG. 1. In an embodiment, for example, FIG. 3 may illustrate an $n^{th}$ stage STAGE[n] among the even-numbered stages 120, 140, 160, . . . included in the scan driver 100 in FIG. 1.

Referring to FIG. 3, the stage 200 may include a first node control circuit 210, an inverted carry node control circuit 220, a carry output circuit 230, a fourth node control circuit 270, a second node control circuit 240, a third node control circuit 250, and a scan output circuit 260. In an embodiment, the stage 200 may further include a capacitor connected to a carry output node NCR from which a carry signal CR[n] is output and/or a capacitor connected to a scan output node NSS from which a scan signal SS[n] is output.

The first node control circuit 210 may control a voltage of a first node N1 in response to an input signal FLM/CR[n−1], the first clock signal CLK1, and the second clock signal CLK2. The input signal FLM/CR[n−1] of the first stage 110 may be the scan-start signal FLM, and the input signal FLM/CR[n−1] of each of the stages 120, 130, 140, 150, 160, . . . excluding the first stage 110 may be the carry signal CR[n−1] of a previous stage. As illustrated in FIG. 3, the first node control circuit 210 included in each of the even-numbered stages 120, 140, 160, . . . may control the voltage of the first node N1 as the input signal FLM/CR[n−1] in response to the first clock signal CLK1 having the high level and the second clock signal CLK2 having the low level, and may maintain the voltage of the first node N1 in response to the first clock signal CLK1 having the low level and the second clock signal CLK2 having the high level. In contrast, the first node control circuit 210 included in each of the odd-numbered stages 110, 130, 150, . . . may control the voltage of the first node N1 as the input signal FLM/CR[n−1] in response to the first clock signal CLK1 having the low level and the second clock signal CLK2 having the high level, and may maintain the voltage of the first node N1 in response to the first clock signal CLK1 having the high level and the second clock signal CLK2 having the low level.

The first node control circuit 210 may include a first transistor T1, a second transistor T2, and a first capacitor C1.

The first transistor T1 may be connected between an input node to which the input signal FLM/CR[n−1] is input and the first node N1, and may include a gate for receiving the second clock signal CLK2. The first transistor T1 may be turned-on in response to the second clock signal CLK2 having the low level, and may apply the input signal FLM/CR[n−1] to the first node N1.

The second transistor T2 may be connected between the input node and the first node N1, and may include a gate for receiving the first clock signal CLK1. The second transistor T2 may be turned-on in response to the first clock signal CLK1 having the high level, and may apply the input signal FLM/CR[n−1] to the first node N1.

The first capacitor C1 may be connected between the first node N1 and a low gate voltage line for transmitting a low gate voltage VGL. A level of the low gate voltage VGL may be the low level. The first capacitor C1 may store the voltage of the first node N1.

The inverted carry node control circuit 220 may control a voltage of an inverted carry node NCRB in response to the voltage of the first node N1. The inverted carry node control circuit 220 may control the voltage of the inverted carry node NCRB such that the voltage of the inverted carry node NCRB is inverted to the voltage of the first node N1. In other words, the voltage of the inverted carry node NCRB may be a voltage obtained by inverting the voltage of the first node N1.

The inverted carry node control circuit 220 may include a third transistor T3 and a fourth transistor T4.

The third transistor T3 may be connected between a high gate voltage line for transmitting a high gate voltage VGH and the inverted carry node NCRB, and may include a gate connected to the first node N1. A level of the high gate voltage VGH may be the high level. The third transistor T3 may be turned-on in response to the voltage of the first node N1 having the low level, and may apply the high gate voltage VGH to the inverted carry node NCRB.

The fourth transistor T4 may be connected between the inverting carry node NCRB and the low gate voltage line, and may include a gate connected to the first node N1. The fourth transistor T4 may be turned-on in response to the voltage of the first node N1 having the high level, and may apply the low gate voltage VGL to the inverted carry node NCRB.

The carry output circuit 230 may output the carry signal CR[n] in response to the voltage of the inverted carry node NCRB. The carry output circuit 230 may control the carry signal CR[n] such that the carry signal CR[n] is inverted to the voltage of the inverted carry node NCRB. In other words, the carry signal CR[n] may have a voltage obtained by inverting the voltage of the inverted carry node NCRB.

The carry output circuit 230 may include a fifth transistor T5 and a sixth transistor T6.

The fifth transistor T5 may be connected between the high gate voltage line and the carry output node NCR, and may include a gate connected to the inverted carry node NCRB. The fifth transistor T5 may be turned-on in response to the voltage of the inverted carry node NCRB having the low level, and may apply the high gate voltage VGH to the carry output node NCR.

The sixth transistor T6 may be connected between the carry output node NCR and the low gate voltage line, and may include a gate connected to the inverted carry node NCRB. The sixth transistor T6 may be turned-on in response to the voltage of the inverted carry node NCRB having the high level, and may apply the low gate voltage VGL to the carry output node NCR.

The fourth node control circuit 270 may control a voltage of a fourth node N4 in response to the carry signal CR[n]. The fourth node control circuit 270 may control the voltage of the fourth node N4 such that the voltage of the fourth node N4 is inverted to the carry signal CR[n]. In other words, the voltage of the fourth node N4 may be a voltage obtained by inverting the carry signal CR[n].

The fourth node control circuit 270 may include a seventh transistor T7 and an eighth transistor T8.

The seventh transistor T7 may be connected between the high gate voltage line and the fourth node N4, and may include a gate for receiving the carry signal CR[n]. The seventh transistor T7 may be turned-on in response to the voltage of the carry output node NCR having the low level, and may apply the high gate voltage VGH to the fourth node N4.

The eighth transistor T8 may be connected between the fourth node N4 and the low gate voltage line, and may include a gate for receiving the carry signal CR[n]. The eighth transistor T8 may be turned-on in response to the voltage of the carry output node NCR having the high level, and may apply the low gate voltage VGL to the fourth node N4.

The second node control circuit 240 may control a voltage of a second node N2 in response to the carry signal CR[n], the enable signal EN, and the voltage of the inverted carry node NCRB. The second node control circuit 240 may maintain the voltage of the second node N2 as a previous level while the carry signal CR[n] having the high level is output and the voltage of the inverted carry node NCRB has the low level. When the carry signal CR[n] having the high level is not output and the enable signal EN has the high level, the second node control circuit 240 may control the voltage of the second node N2 as the low level. Further, when the carry signal CR[n] having the high level is not output and the enable signal EN has the low level, the second node control circuit 240 may control the voltage of the second node N2 as the high level.

The second node control circuit 240 may include a ninth transistor T9, a tenth transistor T10, an eleventh transistor T11, a twelfth transistor T12, and a second capacitor C2.

The ninth and tenth transistors T9 and T10 may be connected in series between the high gate voltage line and the second node N2. The ninth transistor T9 may include a gate for receiving the carry signal CR[n], and the tenth transistor T10 may include a gate for receiving the enable signal EN. The ninth transistor T9 may be turned-on in response to the carry signal CR[n] having the low level, and the tenth transistor T10 may be turned-on in response to the enable signal EN having the low level. The ninth and tenth transistors T9 and T10 may be turned-on in response to the carry signal CR[n] having the low level and the enable signal EN having the low level, and may apply the high gate voltage VGH to the second node N2.

The eleventh and twelfth transistors T11 and T12 may be connected in series between the second node N2 and the low gate voltage line. The eleventh transistor T11 may include a gate for receiving the enable signal EN, and the twelfth transistor T12 may include a gate connected to the inverted carry node NCRB. The eleventh transistor T11 may be turned-on in response to the enable signal EN having the high level, and the twelfth transistor T12 may be turned-on in response to the voltage of the inverted carry node NCRB having the high level. The eleventh and twelfth transistors T11 and T12 may be turned-on in response to the enable signal EN having the high level and the voltage of the inverted carry node NCRB having the high level, and may apply the low gate voltage VGL to the second node N2.

The second capacitor C2 may be connected between the second node N2 and the low gate voltage line. The second capacitor C2 may store the voltage of the second node N2.

The third node control circuit 250 may control a voltage of a third node N3 in response to the voltage of the second node N2 and the voltage of the fourth node N4. The third node control circuit 250 may separate the third node N3 from the fourth node N4 when the voltage of the second node N2 has the high level, and may connect the third node N3 to the fourth node N4 When the voltage of the second node N2 has the low level.

The third node control circuit 250 may include a thirteenth transistor T13 and a fourteenth transistor T14.

The thirteenth transistor T13 may be connected between the high gate voltage line and the third node N3, and may include a gate connected to the second node N2. The thirteenth transistor T13 may be turned-on in response to the voltage of the second node N2 having the high level, and may apply the high gate voltage VGH to the third node N3.

The fourteenth transistor T14 may be connected between the third node N3 and the fourth node N4, and may include a gate connected to the second node N2. The fourteenth transistor T14 may be turned-on in response to the voltage of the second node N2 having the low level, and may apply the voltage of the fourth node N4 to the third node N3.

The scan output circuit 260 may output the scan signal SS[n] in response to the voltage of the third node N3 and the voltage of the fourth node N4. The scan output circuit 260 may include a fifteenth transistor T15 and a sixteenth transistor T16.

The fifteenth transistor T15 may be connected between the high gate voltage line and the scan output node NSS, and may include a gate connected to the third node N3. The fifteenth transistor T15 may be turned-on in response to the voltage of the third node N3 having the low level, and may apply the high gate voltage VGH to the scan output node NSS.

The sixteenth transistor T16 may be connected between the scan output node NSS and the low gate voltage line, and may include a gate connected to the fourth node N4. The sixteenth transistor T16 may be turned-on in response to the voltage of the fourth node N4 having the high level, and may apply the low gate voltage VGL to the scan output node NSS.

In an embodiment, each of the first node control circuit 210, the inverted carry node control circuit 220, the carry output circuit 230, the fourth node control circuit 270, the second node control circuit 240, the third node control circuit 250, and the scan output circuit 260 may include at least one P-type transistor (e.g., PMOS transistor) and at least one N-type transistor (e.g., NMOS transistor). In an embodiment, for example, each of the first transistor T1, the third transistor T3, the fifth transistor T5, the seventh transistor T7, the ninth transistor T9, the tenth transistor T10, the fourteenth transistor T14, and the fifteenth transistor T15 may be the P-type transistor. Further, each of the second transistor T2, the fourth transistor T4, the sixth transistor T6, the eighth transistor T8, the eleventh transistor T11, the twelfth transistor T12, the thirteenth transistor T13, and the sixteenth transistor T16 may be the N-type transistor.

In the stage 200, when the enable signal EN has the high level before the carry signal CR[n] having the high level is output, the second node control circuit 240 may control the voltage of the second node N2 as the low level. The third node control circuit 250 may control the voltage of the third node N3 as the low level in response to the voltage of the second node N2 having the low level while the carry signal CR[n] having the high level is output. The scan output circuit 260 may output the scan signal SS[n] having the high level in response to the voltage of the third node N3 having the low level while the carry signal CR[n] having the high level is output. Although the enable signal EN is changed from the high level to the low level while the carry signal CR[n] having the high level is output, the second node control circuit 240 may maintain the voltage of the second node N2 as the low level until output of the carry signal CR[n] having the high level is terminated. Accordingly, the scan signal SS[n] whose active period has a time length corresponding to two or more horizontal times may be normally output.

Further, in the stage 200, when the enable signal EN has the low level before the carry signal CR[n] having the high level is output, the second node control circuit 240 may control the voltage of the second node N2 as the high level. The third node control circuit 250 may control the voltage of the third node N3 as the high level in response to the voltage of the second node N2 having the high level while the carry signal CR[n] having the high level is output. The scan output circuit 260 may not output the scan signal SS[n] having the high level in response to the voltage of the third node N3 having the high level while the carry signal CR[n] having the high level is output. Although the enable signal EN is changed from the low level to the high level while the carry signal CR[n] having the high level is output, the second node control circuit 240 may maintain the voltage of the second node N2 as the high level until output of the carry signal CR[n] having the high level is terminated. Accordingly, it is possible to prevent unwanted output of the scan signal SS[n] having the high level due to a change in the level of the enable signal EN.

Figure 4:
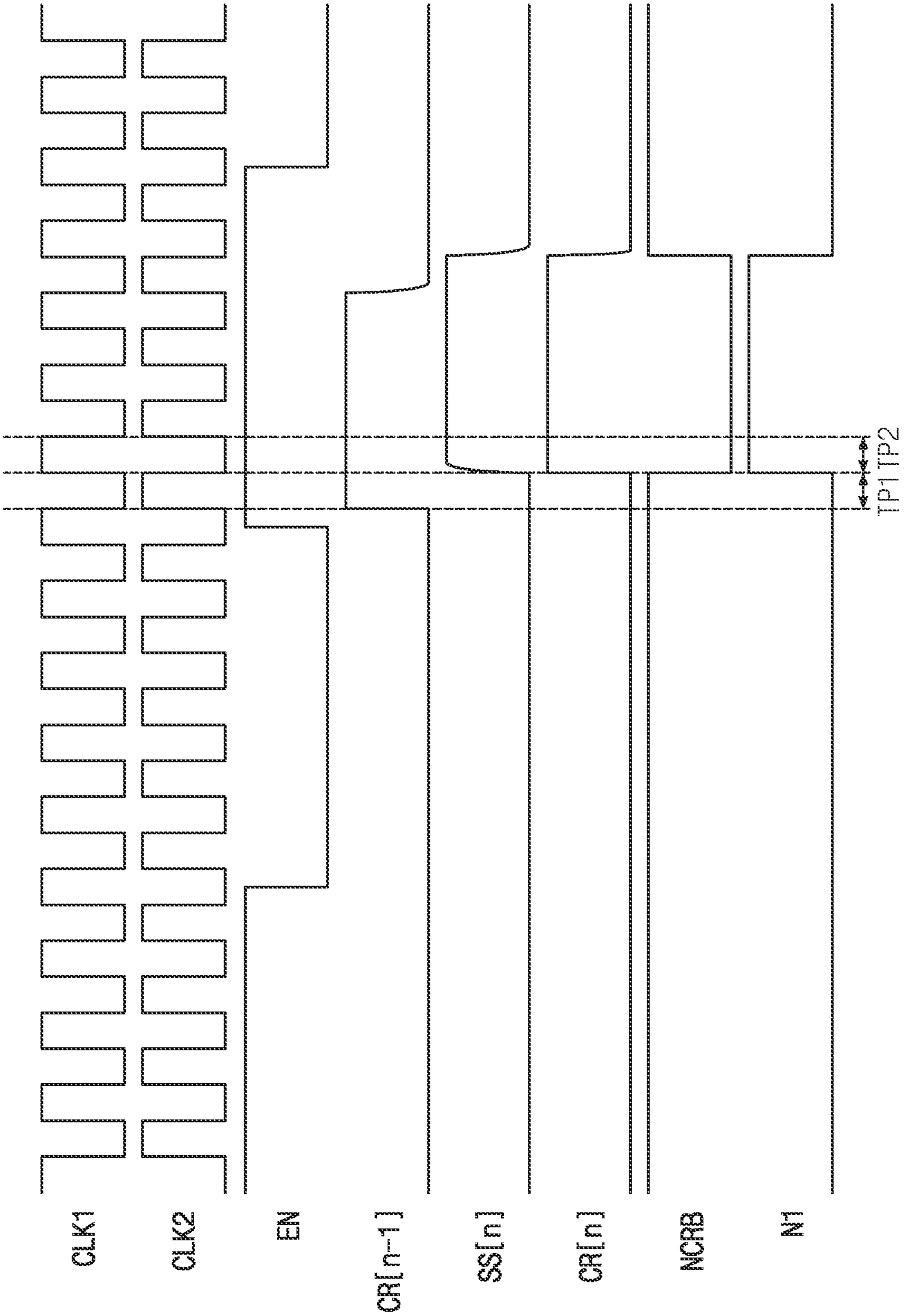
FIG. 4 is a timing diagram for describing an operation of the stage in FIG. 3 when an enable signal has a high level in a period in which a carry signal is output.

FIG. 4 is a timing diagram for describing an operation of the stage 200 in FIG. 3 when the enable signal EN has the high level in a period in which the carry signal CR[n] is output.

Referring to FIG. 4, while the input signal CR[n−1] having the high level is not received, the first node control circuit 210 may control the voltage of the first node N1 to the low level, the inverted carry node control circuit 220 may control the voltage of the inverted carry node NCRB to the high level, the carry output circuit 230 may output the carry signal CR[n] having the low level, the fourth node control circuit 270 may control the voltage of the fourth node N4 to the high level, and the third node control circuit 250 may control the voltage of the third node N3 to the high level. The scan output circuit 260 may output the scan signal SS[n] having the low level in response to the voltage of the third node N3 having the high level and the voltage of the fourth node N4 having the high level.

In a first time period TP1, the input signal CR[n−1] having the high level may be received, the first clock signal CLK1 may have the low level, and the second clock signal CLK2 may have the high level. The first node control circuit 210 may control the voltage of the first node N1 to the low level, the inverted carry node control circuit 220 may control the voltage of the inverted carry node NCRB to the high level, the carry output circuit 230 may output the carry signal CR[n] having the low level, and the fourth node control circuit 270 may control the voltage of the fourth node N4 to the high level.

Further, in the first time period TP1, when the enable signal EN has the high level, the second node control circuit 240 may control the voltage of the second node N2 to the low level, the third node control circuit 250 may control the voltage of the third node N3 to the high level. The scan output circuit 260 may output the scan signal SS[n] having the low level in response to the voltage of the third node N3 having the high level and the voltage of the fourth node N4 having the high level.

In a second time period TP2 after the first time period TP1, the first clock signal CLK1 may have the high level, and the second clock signal CLK2 may have the low level. The first node control circuit 210 may control the voltage of the first node N1 to the high level, the inverted carry node control circuit 220 may control the voltage of the inverted carry node NCRB to the low level, the carry output circuit 230 may output the carry signal CR[n] having the high level, the fourth node control circuit 270 may control the voltage of the fourth node N4 to the low level, the second node control circuit 240 may control the voltage of the second node N2 to the low level, and the third node control circuit 250 may control the voltage of the third node N3 to the low level. The scan output circuit 260 may output the scan signal SS[n] having the high level in response to the voltage of the third node N3 having the low level and the voltage of the fourth node N4 having the low level.

As described above, the enable signal EN has the high level at a time point in which the output of the carry signal CR[n] having the high level is initiated (i.e., an end time point of the first time period TP1 or a start time point of the second time period TP2), the stage 200 may output the scan signal SS[n] having the high level.

Figure 5:
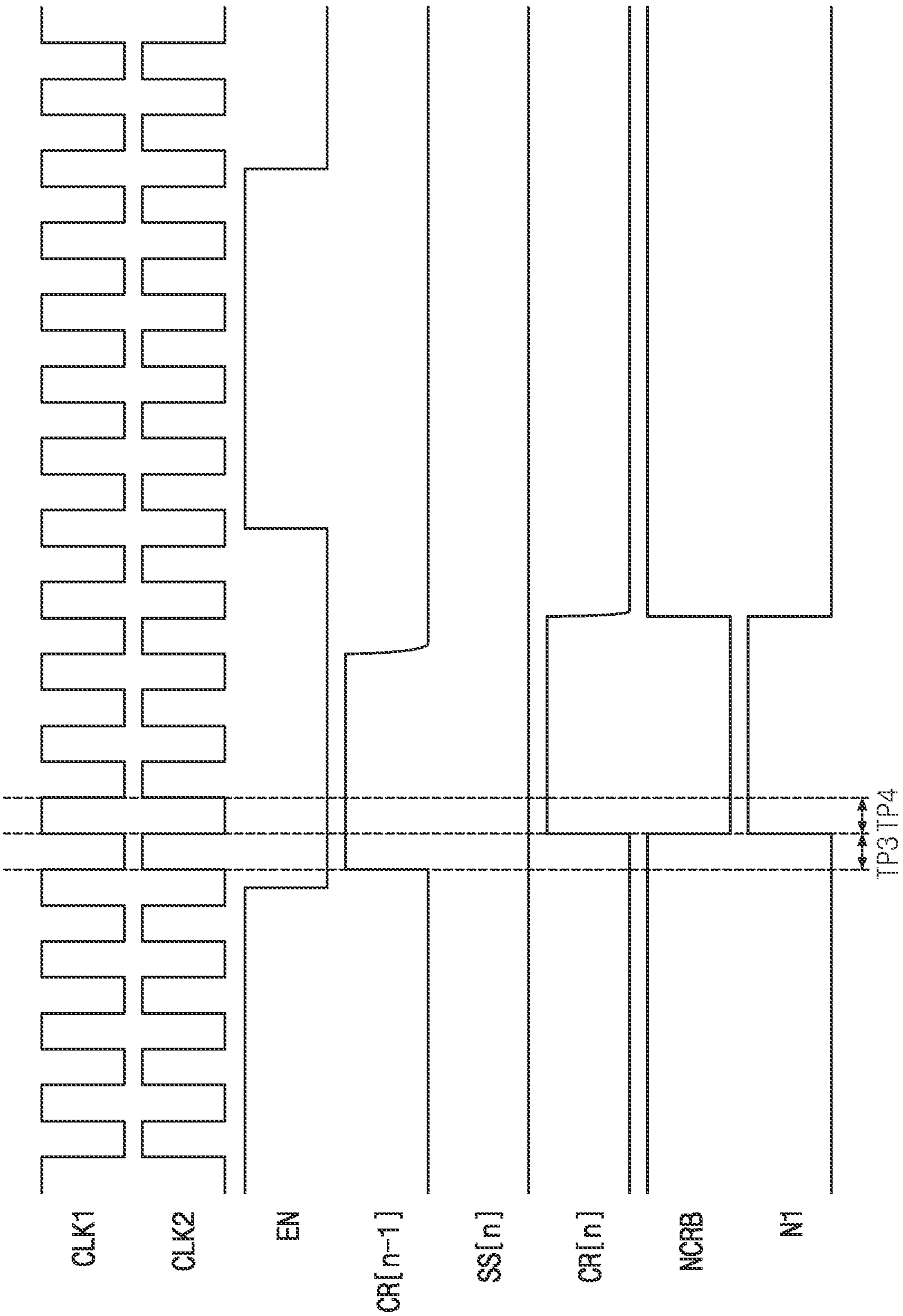
FIG. 5 is a timing diagram for describing an operation of the stage in FIG. 3 when an enable signal has a low level in a period in which a carry signal is output.

FIG. 5 is a timing diagram for describing an operation of the stage 200 in FIG. 3 when the enable signal EN has the low level in a period in which the carry signal CR[n] is output.

Referring to FIG. 5, in a third time period TP3, the input signal CR[n−1] having the high level may be received, the first clock signal CLK1 may have the low level, and the second clock signal CLK2 may have the high level. The first node control circuit 210 may control the voltage of the first node N1 to the low level, the inverted carry node control circuit 220 may control the voltage of the inverted carry node NCRB to the high level, the carry output circuit 230 may output the carry signal CR[n] having the low level, and the fourth node control circuit 270 may control the voltage of the fourth node N4 to the high level.

Further, in the third time period TP3, when the enable signal EN has the low level, the second node control circuit 240 may control the voltage of the second node N2 to the high level, and the third node control circuit 250 may control the voltage of the third node N3 to the high level. The scan output circuit 260 may output the scan signal SS[n] having the low level in response to the voltage of the third node N3 having the high level and the voltage of the fourth node N4 having the high level.

In a fourth time period TP4 after the third time period TP3, the first clock signal CLK1 may have the high level, and the second clock signal CLK2 may have the low level. The first node control circuit 210 may control the voltage of the first node N1 to the high level, the inverted carry node control circuit 220 may control the voltage of the inverted carry node NCRB to the low level, the carry output circuit 230 may output the carry signal CR[n] having the high level, the fourth node control circuit 270 may control the voltage of the fourth node N4 to the low level, the second node control circuit 240 may control the voltage of the second node N2 to the high level, and the third node control circuit 250 may control the voltage of the third node N3 to the high level. The scan output circuit 260 may output the scan signal SS[n] having the low level in response to the voltage of the third node N3 having the high level and the voltage of the fourth node N4 having the low level.

As described above, when the enable signal EN has the low level at a time point in which the output of the carry signal CR[n] having the high level is initiated (i.e., an end time point of the third time period TP3 or a start time point of the fourth time period TP4), the stage 200 may not output the scan signal SS[n] having the high level.

Figure 6:
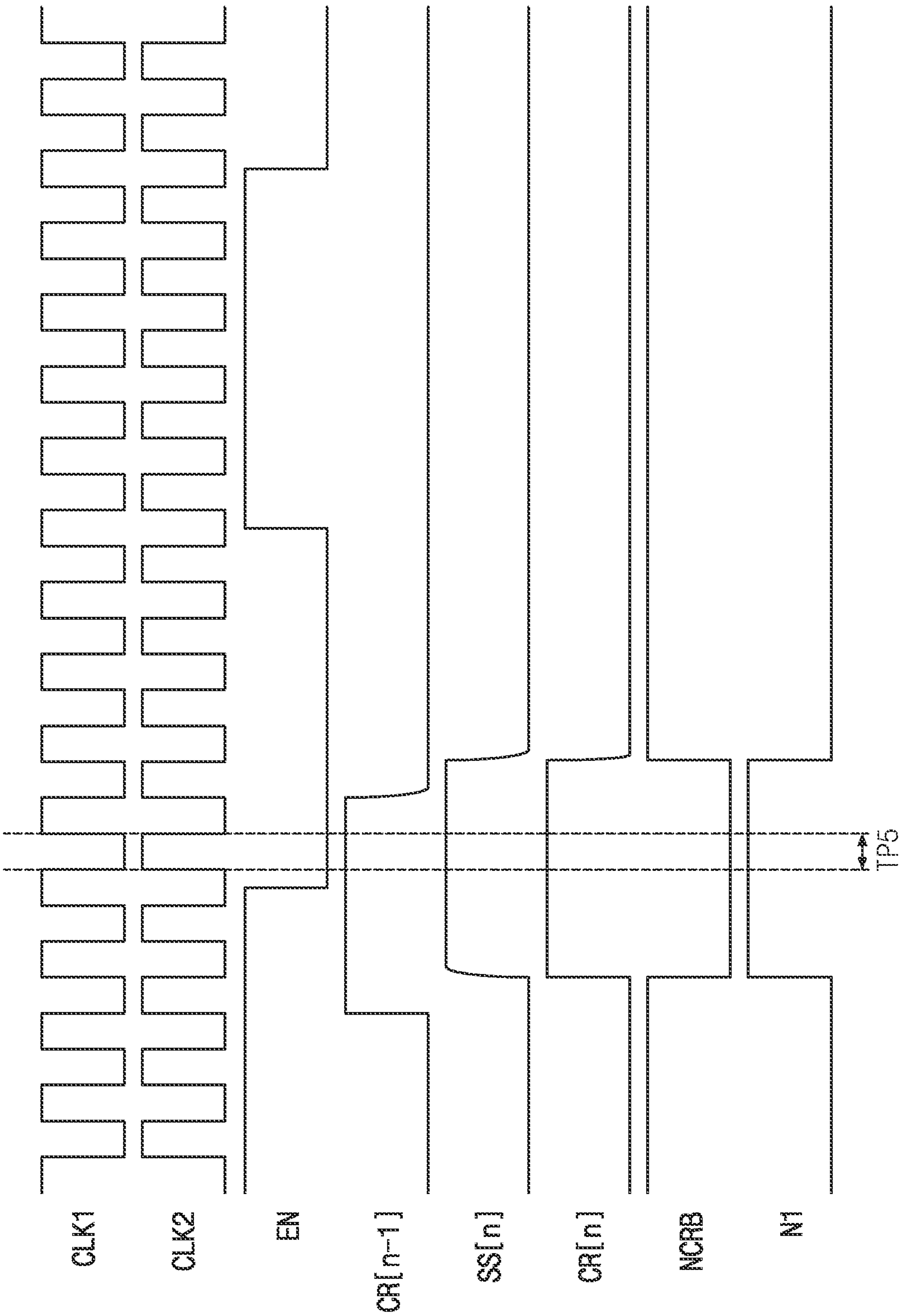
FIG. 6 is a timing diagram for describing an operation of the stage in FIG. 3 when an enable signal changes from a high level to a low level while a carry signal is output.

FIG. 6 is a timing diagram for describing an operation of the stage 200 in FIG. 3 when the enable signal EN changes from the high level to the low level while the carry signal CR[n] is output.

The timing diagram of FIG. 6 may be similar to the timing diagram of FIG. 4 except that the enable signal EN is changed from the high level to the low level while the carry signal CR[n] having the high level is output.

Referring to FIG. 6, in a fifth time period TP5, when the enable signal EN has the low level, the second node control circuit 240 may control the voltage of the second node N2 to the low level, and the third node control circuit 250 may control the voltage of the third node N3 to the low level. The scan output circuit 260 may output the scan signal SS[n] having the high level in response to the voltage of the third node N3 having the low level and the voltage of the fourth node N4 having the low level.

As described above, although the enable signal EN changes from the high level to the low level while the carry signal CR[n] having the high level is output, the stage 200 may continue the output of the scan signal SS having the high level.

Figure 7:
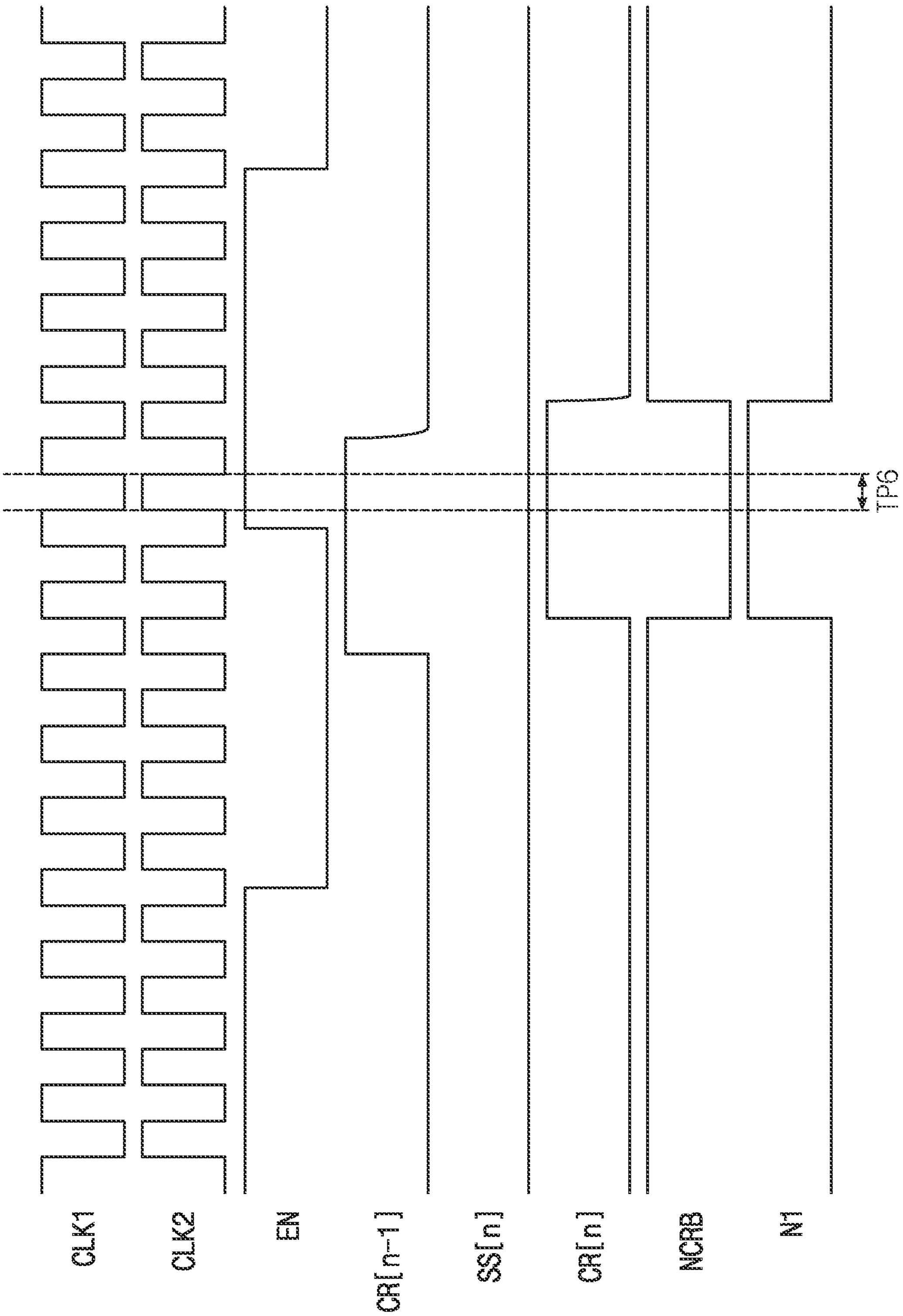
FIG. 7 is a timing diagram for describing an operation of the stage in FIG. 3 when an enable signal changes from a low level to a high level while a carry signal is output.

FIG. 7 is a timing diagram for describing an operation of the stage 200 in FIG. 3 when the enable signal EN changes from the low level to the high level while the carry signal CR[n] is output.

The timing diagram of FIG. 7 may be similar to the timing diagram of FIG. 5 except that the enable signal EN is changed from the low level to the high level while the carry signal CR[n] having the high level is output.

Referring to FIG. 7, in a sixth time period TP6, when the enable signal EN has the high level, the second node control circuit 240 may control the voltage of the second node N2 to the high level, and the third node control circuit 250 may control the voltage of the third node N3 to the high level. The scan output circuit 260 may output the scan signal SS[n] having the low level in response to the voltage of the third node N3 having the high level and the voltage of the fourth node N4 having the low level.

As described above, although the enable signal EN is changed from the low level to the high level while the carry signal CR[n] having the high level is output, the stage 200 may not output the scan signal SS[n] having the high level.

Figure 8:
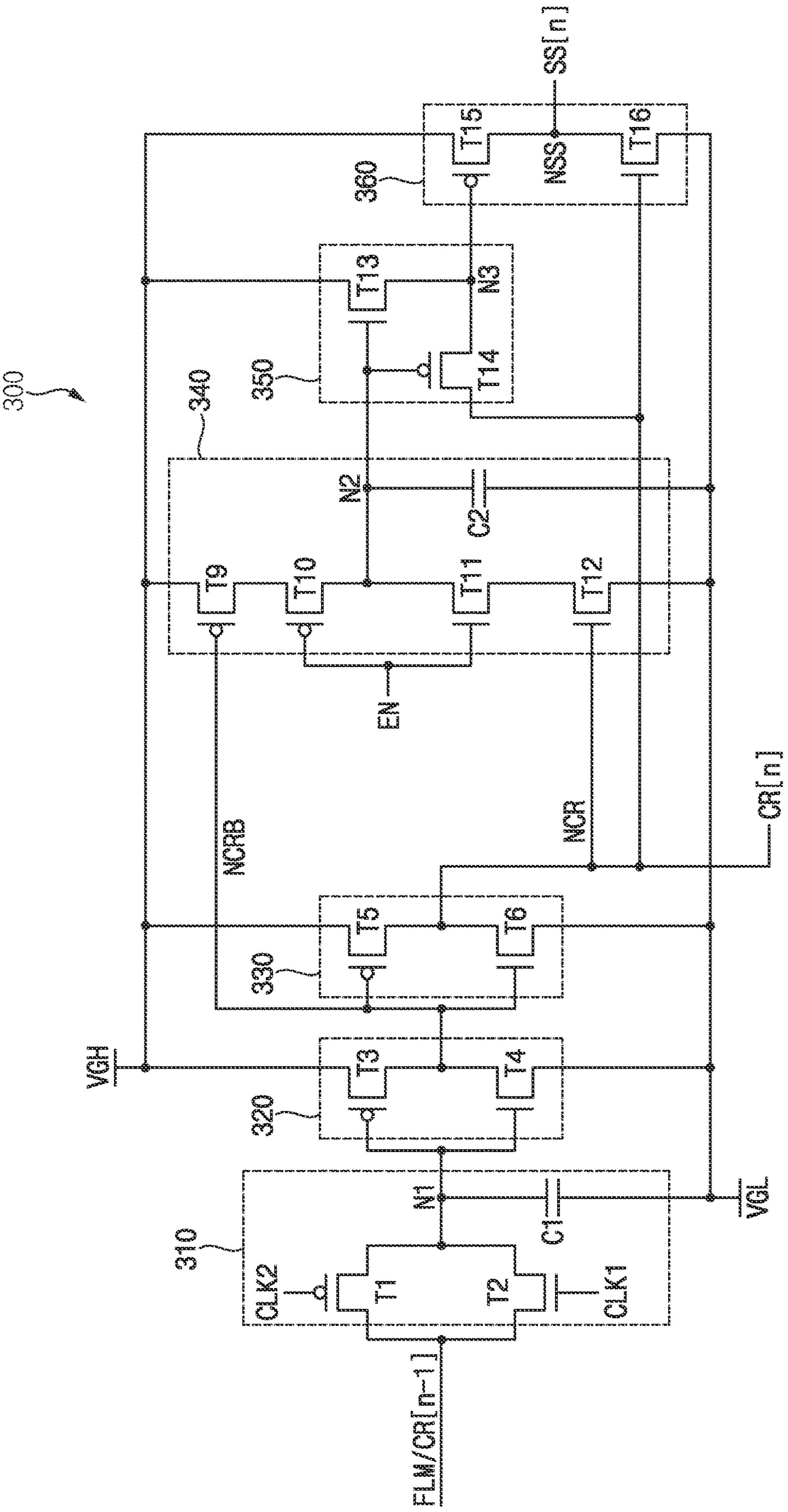
FIG. 8 is a circuit diagram illustrating a stage included in a scan driver according to another embodiment.

FIG. 8 is a circuit diagram illustrating a stage 300 included in a scan driver according to another embodiment.

Referring to FIG. 8, the stage 300 may include a first node control circuit 310, an inverted carry node control circuit 320, a carry output circuit 330, a second node control circuit 340, a third node control circuit 350, and a scan output circuit 360. The stage 300 described with reference to FIG. 8 may be substantially the same as or similar to the stage 200 described with reference to FIG. 3 except that the fourth node control circuit is omitted. Accordingly, descriptions of repeated components are omitted.

In an embodiment, the carry signal CR[n] may be an active low signal having the low level as an active level, and the scan signal SS[n] may be an active high signal having the high level as an active level.

The second node control circuit 340 may control the voltage of the second node N2 in response to the voltage of the inverted carry node NCRB, the enable signal EN, and the carry signal CR[n]. The second node control circuit 340 may maintain the voltage of the second node N2 as a previous level while the carry signal CR[n] having the low level is output and the voltage of the inverted carry node NCRB has the high level. The second node control circuit 340 may control the voltage of the second node N2 as the low level when the carry signal CR[n] having the low level is not output and the enable signal EN has the high level. Further, the second node control circuit 340 may control the voltage of the second node N2 as the high level when the carry signal CR[n] having the low level is not output and the enable signal EN has the low level.

The second node control circuit 340 may include a ninth transistor T9, a tenth transistor T10, an eleventh transistor T11, a twelfth transistor T12, and a second capacitor C2.

The ninth and tenth transistors T9 and T10 may be connected in series between the high gate voltage line and the second node N2. The ninth transistor T9 may include a gate connected to the inverted carry node NCRB, and the tenth transistor T10 may include a gate for receiving the enable signal EN. The ninth transistor T9 may be turned-on in response to the voltage of the inverted carry node NCRB having the low level, and the tenth transistor T10 may be turned-on in response to the enable signal EN having the low level. The ninth and tenth transistors T9 and T10 may be turned-on in response to the voltage of the inverted carry node NCRB having the low level and the enable signal EN having the low level, and may apply the high gate voltage to the second node N2.

The eleventh and twelfth transistors T11 and T12 may be connected in series between the second node N2 and the low gate voltage line. The eleventh transistor T11 may include a gate for receiving the enable signal EN, and the twelfth transistor T12 may include a gate for receiving the carry signal CR[n]. The eleventh transistor T11 may be turned-on in response to the enable signal EN having the high level, and the twelfth transistor T12 may be turned-on in response to the carry signal CR[n] having the high level. The eleventh and twelfth transistors T11 and T12 may be turned-on in response to the enable signal EN having the high level and the carry signal CR[n] having the high level, and may apply the low gate voltage VGL to the second node N2.

The second capacitor C2 may be connected between the second node N2 and the low gate voltage line. The second capacitor C2 may store the voltage of the second node N2.

The third node control circuit 350 may control the voltage of the third node N3 in response to the voltage of the second node N2 and the carry signal CR[n]. The third node control circuit 350 may separate the third node N3 from the carry output node NCR when the voltage of the second node N2 has the high level, and may connect the third node N3 to the carry output node NCR when the voltage of the second node N2 has the low level.

The third node control circuit 350 may include a thirteenth transistor T13 and a fourteenth transistor T14.

The thirteenth transistor T13 may be connected between the high gate voltage line and the third node N3, and may include a gate connected to the second node N2. The thirteenth transistor T13 may be turned-on in response to the voltage of the second node N2 having the high level, and may apply the high gate voltage VGH to the third node N3.

The fourteenth transistor T14 may be connected between the third node N3 and the carry output node NCR, and may include a gate connected to the second node N2. The fourteenth transistor T14 may be turned-on in response to the voltage of the second node N2 having the low level, and may apply the carry signal CR[n] to the third node N3.

The scan output circuit 360 may output the scan signal SS[n] in response to the voltage of the third node N3 and the carry signal CR[n]. The scan output circuit 360 may include a fifteenth transistor T15 and a sixteenth transistor T16.

The fifteenth transistor T15 may be connected between the high gate voltage line and the scan output node NSS, and may include a gate connected to the third node N3. The fifteenth transistor T15 may be turned-on in response to the voltage of the third node N3 having the low level, and may apply the high gate voltage VGH to the scan output node NSS.

The sixteenth transistor T16 may be connected between the scan output node NSS and the low gate voltage line, and may include a gate for receiving the carry signal CR[n]. The sixteenth transistor T16 may be turned-on in response to the carry signal CR[n] having the high level, and may apply the low gate voltage VGL to the scan output node NSS.

In the stage 300, when the enable signal EN has the high level before the carry signal CR[n] having the low level is output, the second node control circuit 340 may control the voltage of the second node N2 to the low level. The third node control circuit 350 may control the voltage of the third node N3 to the low level in response to the voltage of the second node N2 having the low level while the carry signal CR[n] having the low level is output. The scan output circuit 360 may output the scan signal SS[n] having the high level in response to the voltage of the third node N3 having the low level while the carry signal CR[n] having the low level is output. Although the enable signal EN is changed from the high level to the low level while the carry signal CR[n] having the low level is output, the second node control circuit 340 may maintain the voltage of the second node N2 to the low level until the output of the carry signal CR[n] having the low level is terminated. Accordingly, the scan signal SS[n] whose active period has a time length corresponding to two or more horizontal times may be normally output.

Further, in the stage 300, when the enable signal EN has the low level before the carry signal CR[n] having the low level is output, the second node control circuit 340 may control the voltage of the second node N2 to the high level. The third node control circuit 350 may control the voltage of the third node N3 to the high level in response to the voltage of the second node N2 having the high level while the carry signal CR[n] having the low level is output. The scan output circuit 360 may not output the scan signal SS[n] having the high level in response to the voltage of the third node N3 having the high level while the carry signal CR[n] having the low level is output. Although the enable signal EN is changed from the low level to the high level while the carry signal CR[n] having the low level is output, the second node control circuit 340 may maintain the voltage of the second node N2 to the high level until the carry signal CR[n] having the low level is terminated. Accordingly, it is possible to prevent unwanted output of the scan signal SS[n] having the high level due to a change in the level of the enable signal EN.

Figure 9:
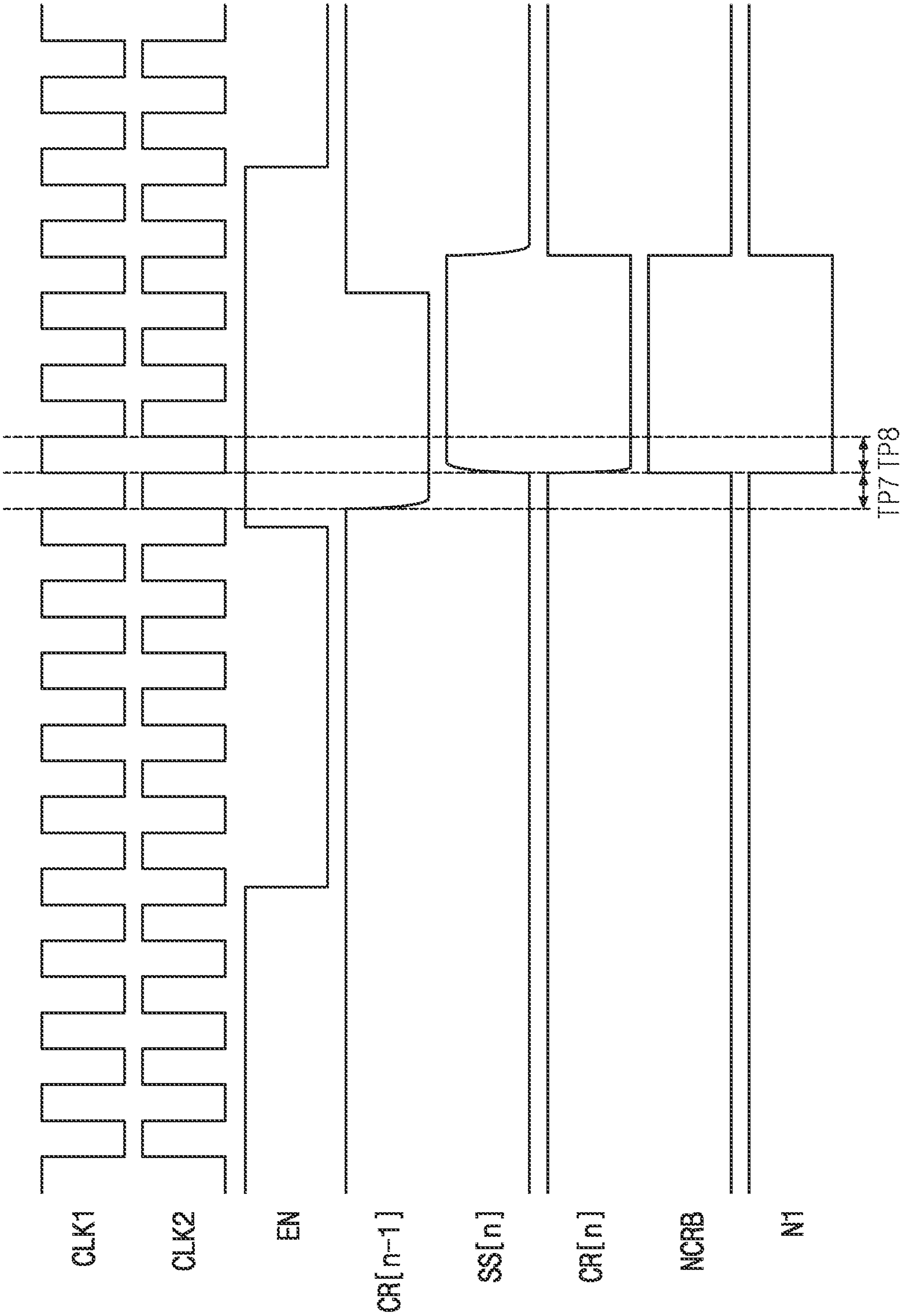
FIG. 9 is a timing diagram for describing an operation of the stage in FIG. 8 when an enable signal has a high level in a period in which a carry signal is output.

FIG. 9 is a timing diagram for describing an operation of the stage 300 in FIG. 8 when the enable signal EN has the high level in a period in which the carry signal CR[n] is output.

Referring to FIG. 9, while the input signal CR[n−1] having the low level is not received, the first node control circuit 310 may control the voltage of the first node N1 to the high level, the inverted carry node control circuit 320 may control the voltage of the inverted carry node NCRB to the low level, the carry output circuit 330 may output the carry signal CR[n] having the high level, and the third node control circuit 350 may control the voltage of the third node N3 to the high level. The scan output circuit 360 may output the scan signal SS[n] having the low level in response to the voltage of the third node N3 having the high level and the carry signal CR[n] having the high level.

In a seventh time period TP7, the input signal CR[n−1] having the low level may be received, the first clock signal CLK1 may have the low level, and the second clock signal CLK2 may have the high level. The first node control circuit 310 may control the voltage of the first node N1 to the high level, the inverted carry node control circuit 320 may control the voltage of the inverted carry node NCRB to the low level, and the carry output circuit 330 may output the carry signal CR[n] having the high level.

Further, in the seventh time period TP7, when the enable signal EN has the high level, the second node control circuit 340 may control the voltage of the second node N2 to the low level, and the third node control circuit 350 may control the voltage of the third node N3 to the high level. The scan output circuit 360 may output the scan signal SS[n] having the low level in response to the voltage of the third node N3 having the high level and the carry signal CR[n] having the high level.

In an eighth time period TP8 after the seventh time period TP7, the first clock signal CLK1 may have the high level, and the second clock signal CLK2 may have the low level. The first node control circuit 310 may control the voltage of the first node N1 to the low level, the inverted carry node control circuit 320 may control the voltage of the inverted carry node NCRB to the high level, the carry output circuit 330 may output the carry signal CR[n] having the low level, the second node control circuit 340 may control the voltage of the second node N2 to the low level, and the third node control circuit 350 may control the voltage of the third node N3 to the low level. The scan output circuit 360 may output the scan signal SS[n] having the high level in response to the voltage of the third node N3 having the low level and the carry signal CR[n] having the low level.

As described above, when the enable signal EN has the high level at a time point in which the output of the carry signal CR[n] having the low level is initiated (i.e., an end time point of the seventh time period TP7 or a start time point of the eighth time period TP8), the stage 300 may output the scan signal SS[n] having the high level.

Figure 10:
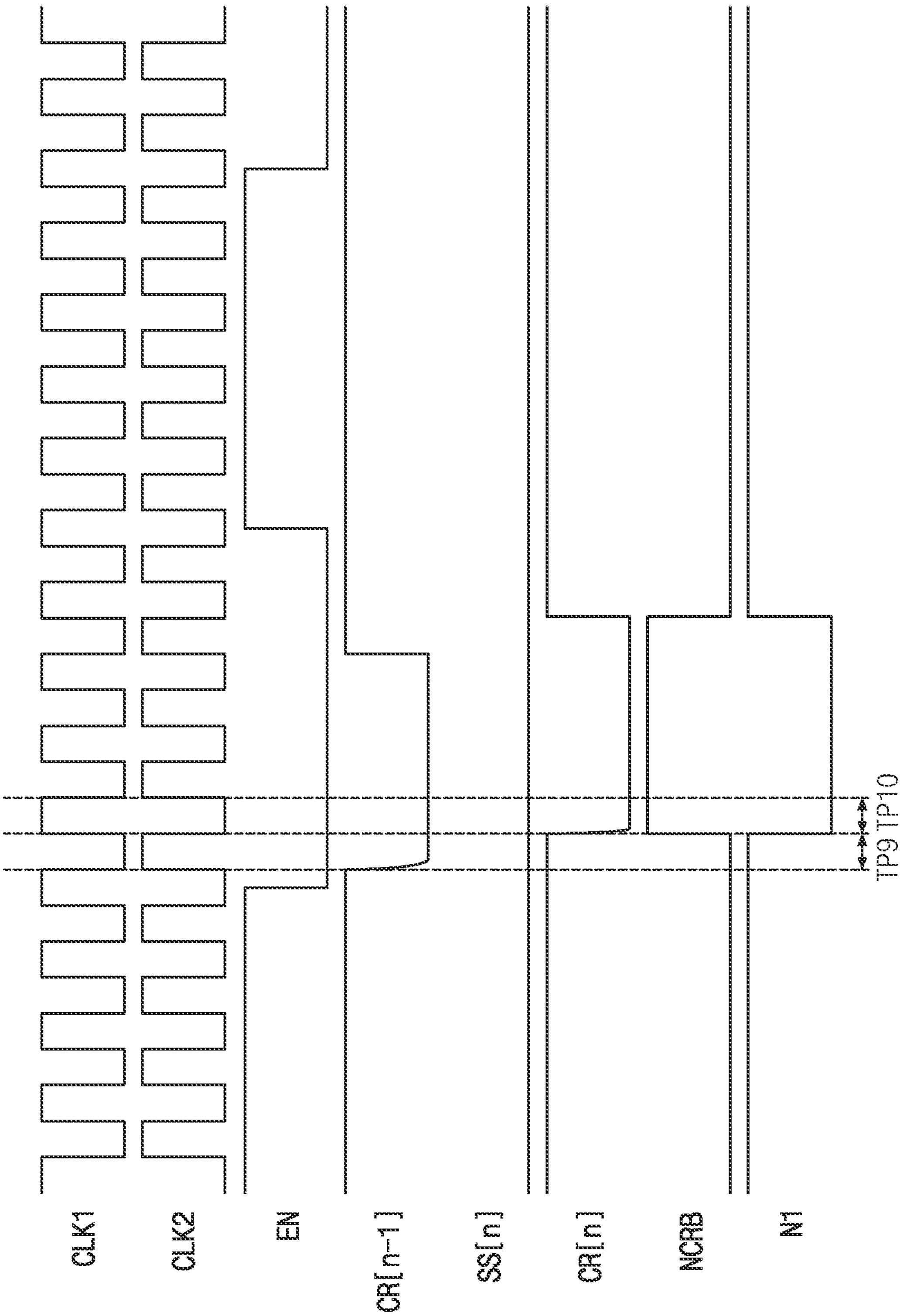
FIG. 10 is a timing diagram for describing an operation of the stage in FIG. 8 when an enable signal has a low level in a period in which a carry signal is output.

FIG. 10 is a timing diagram for describing an operation of the stage 300 in FIG. 8 when the enable signal EN has the low level in a period in which the carry signal CR[n] is output.

Referring to FIG. 10, in a ninth time period TP9, the input signal CR[n−1] having the low level may be received, the first clock signal CLK1 may have the low level, and the second clock signal CLK2 may have the high level. The first node control circuit 310 may control the voltage of the first node N1 to the high level, the inverted carry node control circuit 320 may control the voltage of the inverted carry node NCRB to the low level, and the carry output circuit 330 may output the carry signal CR[n] having the high level.

Further, in the ninth time period TP9, when the enable signal EN has the low level, the second node control circuit 340 may control the voltage of the second node N2 to the high level, and the third node control circuit 350 may control the voltage of the third node N3 to the high level. The scan output circuit 360 may output the scan signal SS[n] having the low level in response to the voltage of the third node N3 having the high level and the carry signal CR[n] having the high level.

In a tenth time period TP10 after the ninth time period TP9, the first clock signal CLK1 may have the high level, and the second clock signal CLK2 may have the low level. The first node control circuit 310 may control the voltage of the first node N1 to the low level, the inverted carry node control circuit 320 may control the voltage of the inverted carry node NCRB to the high level, the carry output circuit 330 may output the carry signal CR[n] having the low level, the second node control circuit 340 may control the voltage of the second node N2 to the high level, and the third node control circuit 350 may control the voltage of the third node N3 to the high level. The scan output circuit 360 may output the scan signal SS[n] having the low level in response to the voltage of the third node N3 having the high level and the carry signal CR[n] having the low level.

As described above, when the enable signal EN has the low level at a time point in which the output of the carry signal CR[n] having the low level is initiated (i.e., an end time point of the ninth time period TP9 or a start time point of the tenth time period TP10), the stage 300 may not output the scan signal SS[n] having the high level.

Figure 11:
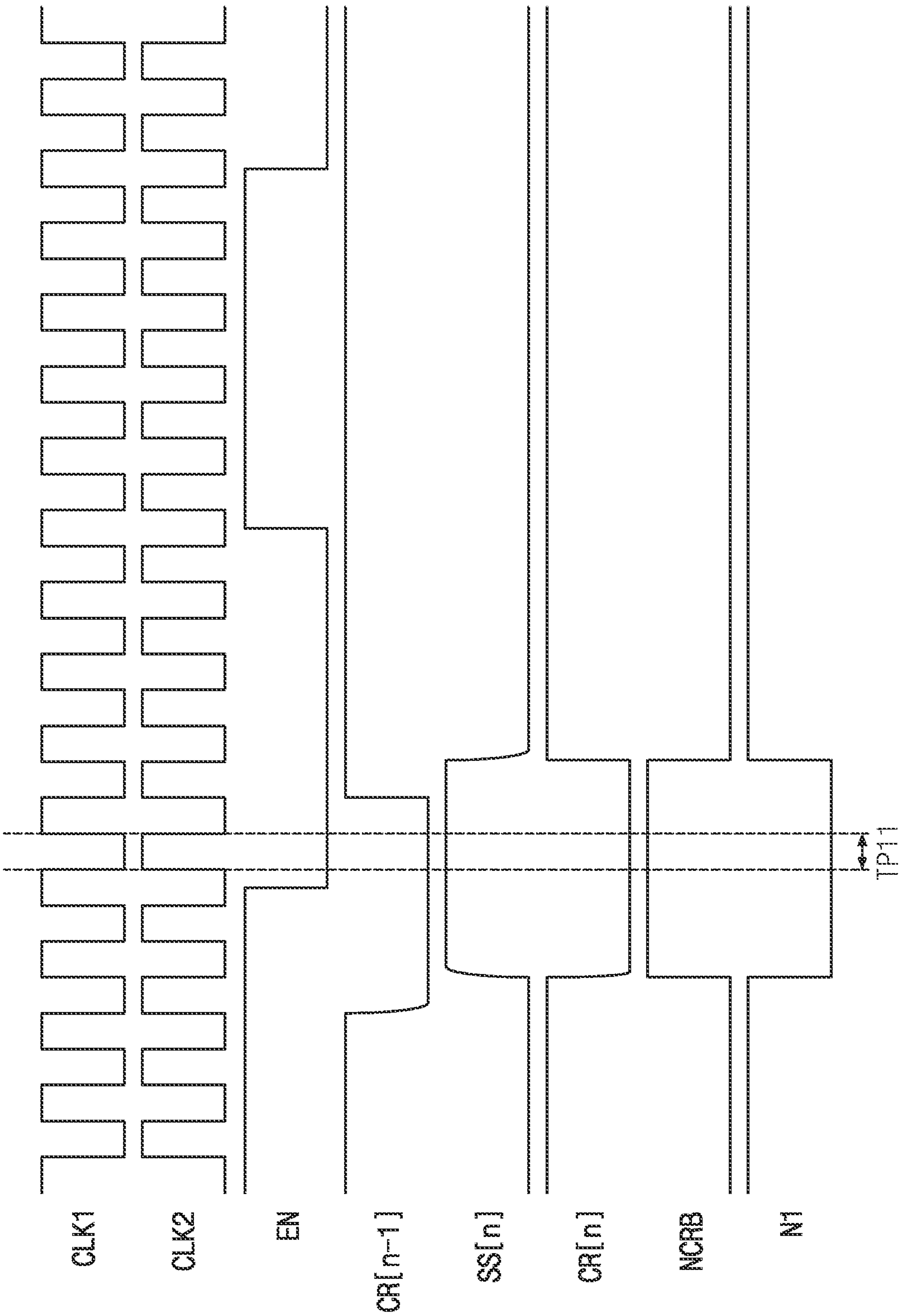
FIG. 11 is a timing diagram for describing an operation of the stage in FIG. 8 when an enable signal changes from a high level to a low level while a carry signal is output.

FIG. 11 is a timing diagram for describing an operation of the stage 300 in FIG. 8 when the enable signal EN changes from the high level to the low level while the carry signal CR[n] is output.

The timing diagram of FIG. 11 may be similar to the timing diagram of FIG. 9 except that the enable signal EN is changed from the high level to the low level while the carry signal CR[n] having the low level is output.

Referring to FIG. 11, in an eleventh time period TP11, when the enable signal EN has the low level, the second node control circuit 340 may control the voltage of the second node N2 to the low level, and the third node control circuit 350 may control the voltage of the third node N3 to the low level. The scan output circuit 360 may output the scan signal SS[n] having the high level in response to the voltage of the third node N3 having the low level and the carry signal CR[n] having the low level.

As described above, although the enable signal EN is changed from the high level to the low level while the carry signal CR[n] having the low level is output, the stage 300 may maintain the output of the scan signal SS having the high level.

Figure 12:
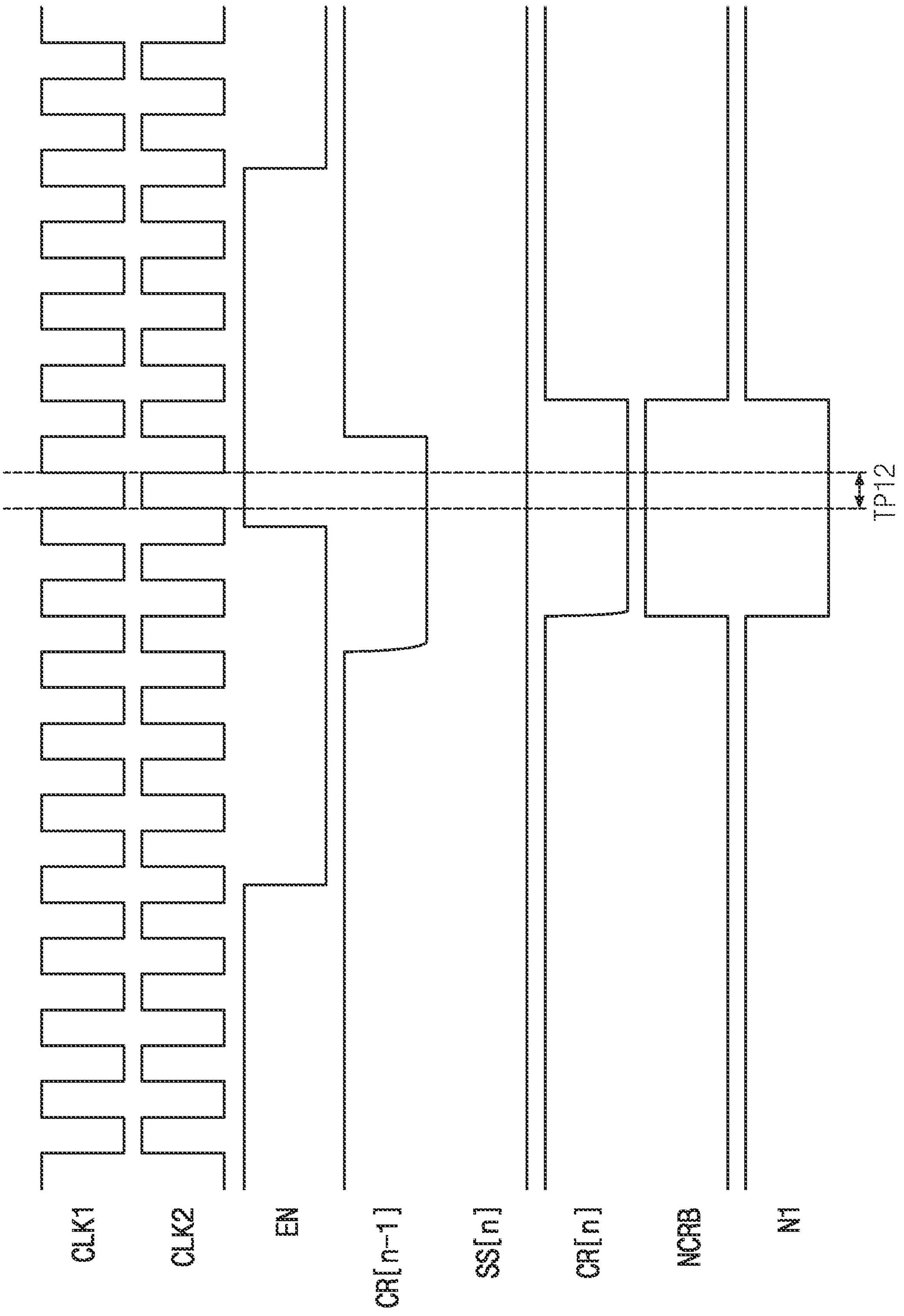
FIG. 12 is a timing diagram for describing an operation of the stage in FIG. 8 when an enable signal changes from a low level to a high level while a carry signal is output.

FIG. 12 is a timing diagram for describing an operation of the stage 300 in FIG. 8 when the enable signal EN changes from the low level to the high level while the carry signal CR[n] is output.

The timing diagram of FIG. 12 may be similar to the timing diagram of FIG. 10 except that the enable signal EN is changed from the low level to the high level while the carry signal CR[n] having the low level is output.

Referring to FIG. 12, in a twelfth time period TP12, when the enable signal EN has the high level, the second node control circuit 340 may control the voltage of the second node N2 to the high level, and the third node control circuit 350 may control the voltage of the third node N3 to the high level. The scan output circuit 360 may output the scan signal SS[n] having the low level in response to the voltage of the third node N3 having the high level and the carry signal CR[n] having the low level.

As described above, although the enable signal EN is changed from the low level to the high level while the carry signal CR[n] having the low level is output, the stage 300 may not output the scan signal SS[n] having the high level.

Figure 13:
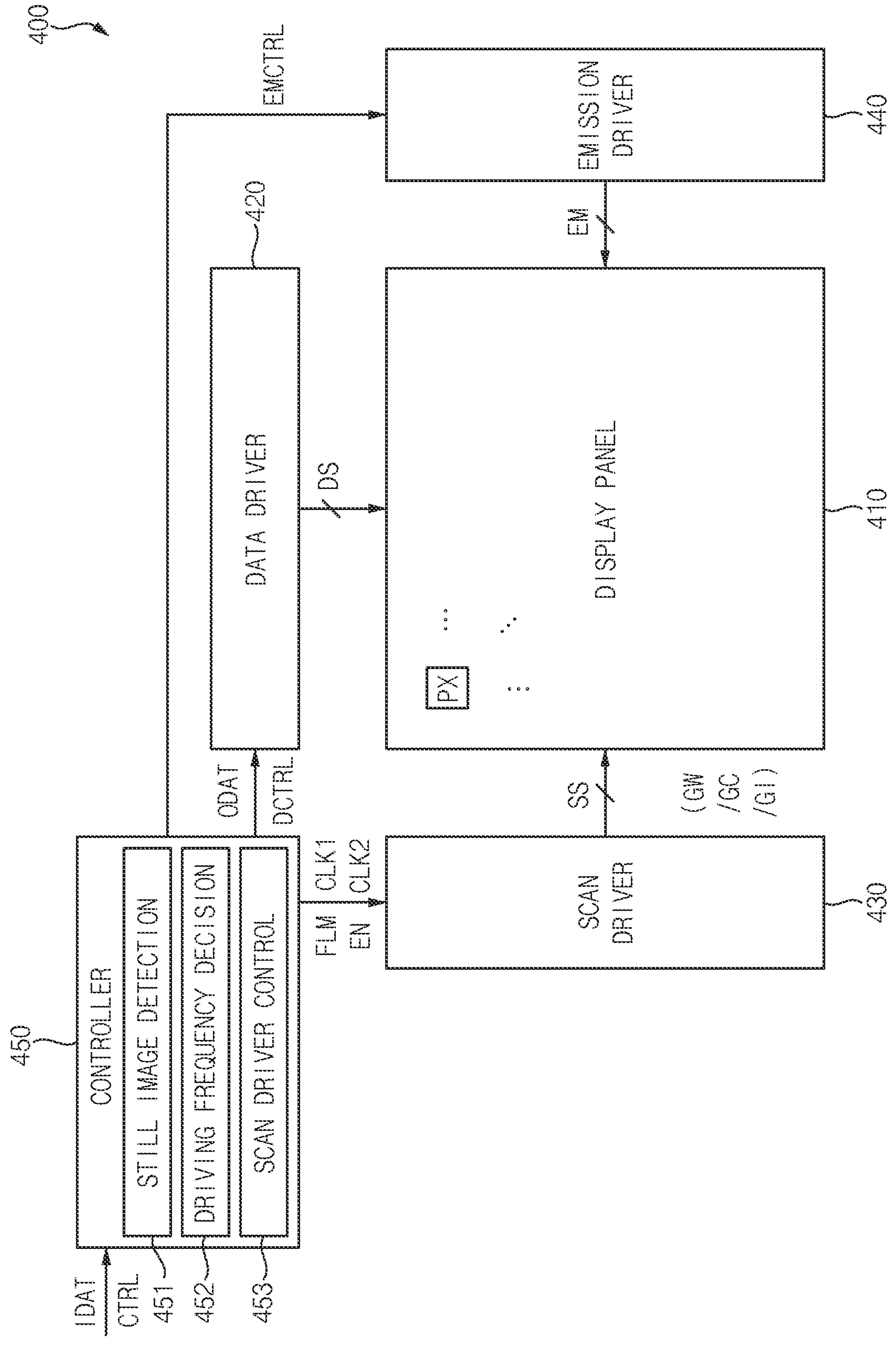
FIG. 13 is a block diagram illustrating a display device according to an embodiment.

FIG. 13 is a block diagram illustrating a display device 400 according to an embodiment.

Referring to FIG. 13, the display device 400 may include a display panel 410, a data driver 420, a scan driver 430, and a controller 450. In an embodiment, the display device 400 may further include an emission driver 440.

The display panel 410 may include a plurality of scan lines, a plurality of emission lines, a plurality of data lines, and a plurality of pixels PX connected thereto. In an embodiment, each of the pixels PX may include a light emitting element, and the display panel 410 may be a light emitting display panel.

The data driver 420 may generate data signals DS based on a data control signal DCTRL and output image data ODAT received from the controller 450, and may provide the data signals DS to the pixels PX through the data lines. In an embodiment, the data control signal DCTRL may include an output data-enable signal, a horizontal start signal, a load signal, or the like. In an embodiment, the data driver 420 and controller 450 may be implemented as a single integrated circuit, and such integrated circuit may be referred to as a timing controller embedded data driver ("TED"). In another embodiment, the data driver 420 and the controller 450 may be implemented as separate integrated circuits.

The scan driver 430 may generate scan signals SS based on a scan control signal received from the controller 450, and may provide the scan signals SS to the pixels PX through the scan lines. In an embodiment, the scan control signal may include the scan-start signal FLM, the first clock signal CLK1, the second clock signal CLK2, the enable signal EN, or the like. In an embodiment, the scan signal SS may include a write gate signal GW, a compensation gate signal GC, and an initialization gate signal GI. In an embodiment, the scan driver 430 may be integrated or formed on a peripheral area of the display panel 410. In another embodiment, the scan driver 430 may be implemented as one or more integrated circuits.

The emission driver 440 may generate emission signals EM based on an emission control signal EMCTRL received from the controller 450, and may provide the emission signals EM to the pixels PX through the emission lines. In an embodiment, the emission driver 440 may be integrated or formed on the peripheral area of the display panel 410. In another embodiment, the emission driver 440 may be implemented as one or more integrated circuits.

The controller 450 (e.g., a timing controller ("T-CON")) may receive input image data IDAT and a control signal CTRL from an external host (e.g., a graphic processing unit ("GPU") or a graphic card). In an embodiment, the control signal CTRL may include a vertical synchronization signal, a horizontal synchronization signal, an input data-enable signal, a master clock signal, or the like. The controller 450 may generate the output image data ODAT, the data control signal DCTRL, the scan control signal, and the emission control signal EMCTRL based on the input image data IDAT and the control signal CTRL. The controller 450 may control the data driver 420 by providing the output image data ODAT and the data control signal DCTRL to the data driver 420, may control the scan driver 430 by providing the scan control signal to the scan driver 430, and may control the emission driver 440 by providing the emission control signal EMCTRL to the emission driver 440.

The display device 400 may perform a multi frequency driving ("MFD") for driving a plurality of areas (hereinafter, panel areas) of the display panel 410 with a plurality of (different) driving frequencies. To perform such multi frequency driving, in an embodiment, the controller 450 may include a still image detection block 451, a driving frequency decision block 452, and a scan driver control block 453.

The still image detection block 451 may divide the input image data IDAT into a plurality of panel area data for a plurality of panel areas each including at least one pixel row, and may determine whether each of the panel area data represents a still image.

The driving frequency decision block 452 may determine driving frequencies for the panel areas according to whether each of the panel area data represents the still image. In an embodiment, when the panel area data represents a video image, the driving frequency decision block 452 may determine a driving frequency for a panel area corresponding to the panel area data as a normal driving frequency. Here, the normal driving frequency may be a driving frequency during a normal driving of the display device 400, and may be, for example, the same as an input frame frequency of the input image data IDAT. Further, when the panel area data represents the still image, the driving frequency decision block 452 may determine a driving frequency for a panel area corresponding to the panel area data as a low driving frequency lower than the normal driving frequency. Here, the low driving frequency may be any frequency lower than the normal driving frequency.

The scan driver control block 453 may generate the enable signal EN based on the driving frequencies for the panel areas. In an embodiment, the scan driver control block 453 may control the enable signal EN such that the enable signal EN has the high level when the scan signal SS is to be output, and has the low level when the scan signal SS is not to be output. Accordingly, the scan signal SS may be provided in frame periods to the panel area driven at the normal driving frequency, but the scan signal SS may not be provided in at least some of the frame periods to the panel area driven at the low driving frequency.

Figure 14:
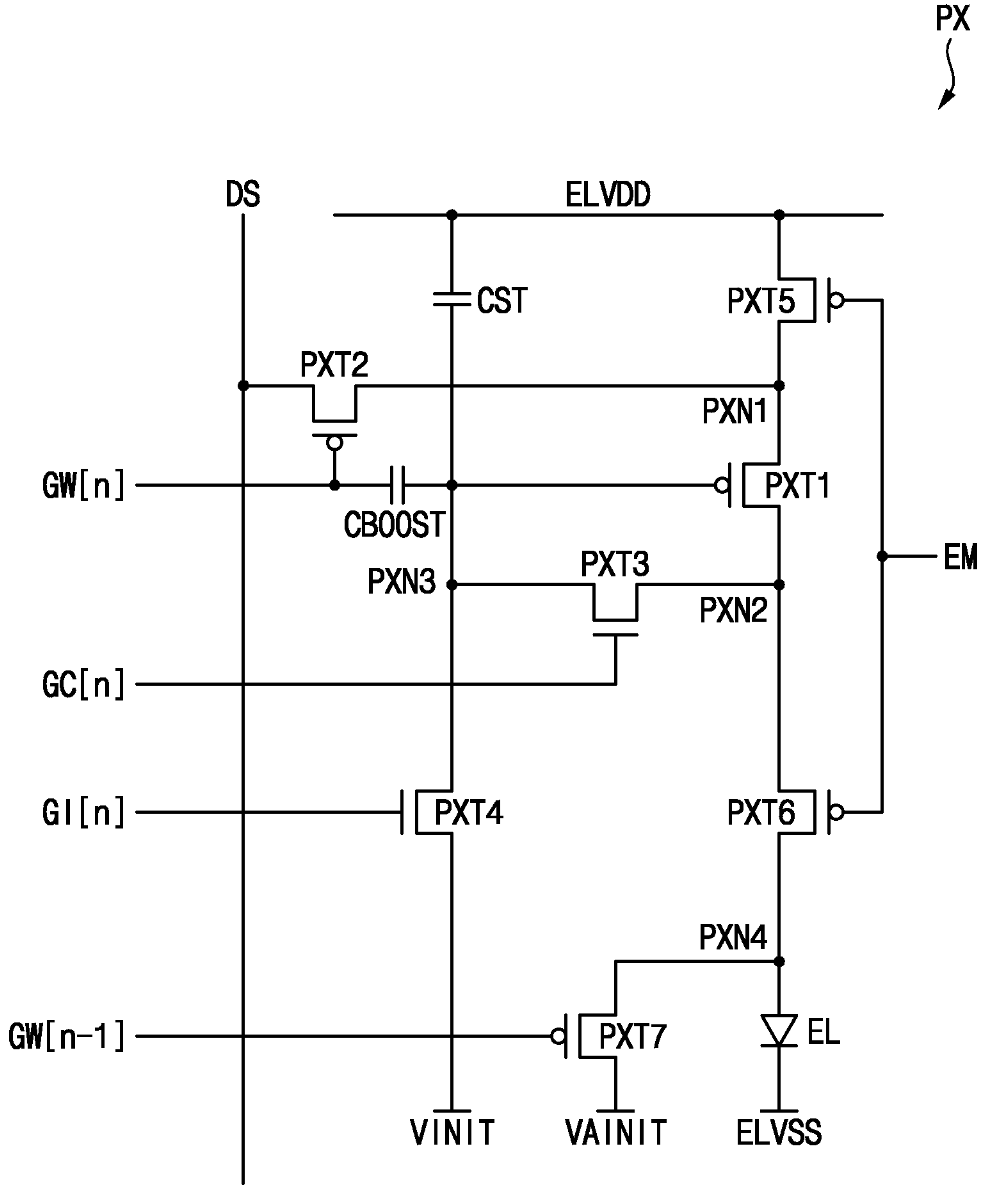
FIG. 14 is a circuit diagram illustrating a pixel included in the display device in FIG. 13.

FIG. 14 is a circuit diagram illustrating the pixel PX included in the display device 400 in FIG. 13. In an embodiment, for example, FIG. 14 may illustrate the pixel PX of an $n^{th}$ pixel row.

Referring to FIG. 14, the pixel PX may include a driving transistor PXT1, a write transistor PXT2, a compensation transistor PXT3, an initialization transistor PXT4, a storage capacitor CST, and a light emitting diode EL. In an embodiment, the pixel PX may further include a first emission transistor PXT5, a second emission transistor PXT6, a bypass transistor PXT7, and a boost capacitor CBOOST.

The driving transistor PXT1 may be connected between a first pixel node PXN1 and a second pixel node PXN2, and may control a driving current provided to the light emitting diode EL in response to a voltage of a third pixel node PXN3. The write transistor PXT2 may be connected between the data line for transmitting the data signal DS and the first pixel node PXN1, and may be turned-on in response to the write gate signal GW[n]. The compensation transistor PXT3 may be connected between the second pixel node PXN2 and the third pixel node PXN3, and may be turned-on in response to the compensation gate signal GC[n]. The initialization transistor PXT4 may be connected between a first initialization voltage line for transmitting a first initialization voltage VINIT and the third pixel node PXN3, and may be turned-on in response to the initialization gate signal GI[n]. The first emission transistor PXT5 may be connected between a first power line for transmitting a first power voltage ELVDD and the first pixel node PXN1, and may be turned-on in response to the emission signal EM. The second emission transistor PXT6 may be connected between the third pixel node PXN3 and a fourth pixel node PXN4, and may be turned-on in response to the emission signal EM. The bypass transistor PXT7 may be connected between a second initialization voltage line for transmitting a second initialization voltage VAINIT and the fourth pixel node PXN4, and may be turned-on in response to a previous write gate signal GI[n−1]. The storage capacitor CST may be connected between the first power line and the third pixel node PXN3. The boost capacitor CBOOST may be connected between a write gate line for transmitting the write gate signal GW[n] and the third pixel node PXN3. The light emitting diode EL may be connected between the fourth pixel node PXN4 and a second power line for transmitting a second power voltage ELVSS, and may emit light based on the driving current.

In an embodiment, the pixel PX may include at least one P-type transistor (e.g., PMOS transistor) and at least one N-type transistor (e.g., NMOS transistor). In an embodiment, for example, each of the driving transistor PXT1, the write transistor PXT2, the first emission transistor PXT5, the second emission transistor PXT6, and the bypass transistor PXT7 may be the P-type transistor. Further, each of the compensation transistor PXT3 and the initialization transistor PXT4 may be the N-type transistor.

In an embodiment, the scan signal SS[n] output from the stage 200 in FIG. 3 or the stage 300 in FIG. 8 may be the compensation gate signal GC[n] or the initialization gate signal GI[n]. In other words, at least one of the compensation gate signal GC[n] and the initialization gate signal GI[n] applied to the compensation transistor PXT3 and the initialization transistor PXT4 implemented with the N-type transistors may be generated and output by the stage 200 in FIG. 3 or the stage 300 in FIG. 8.

Figure 15:
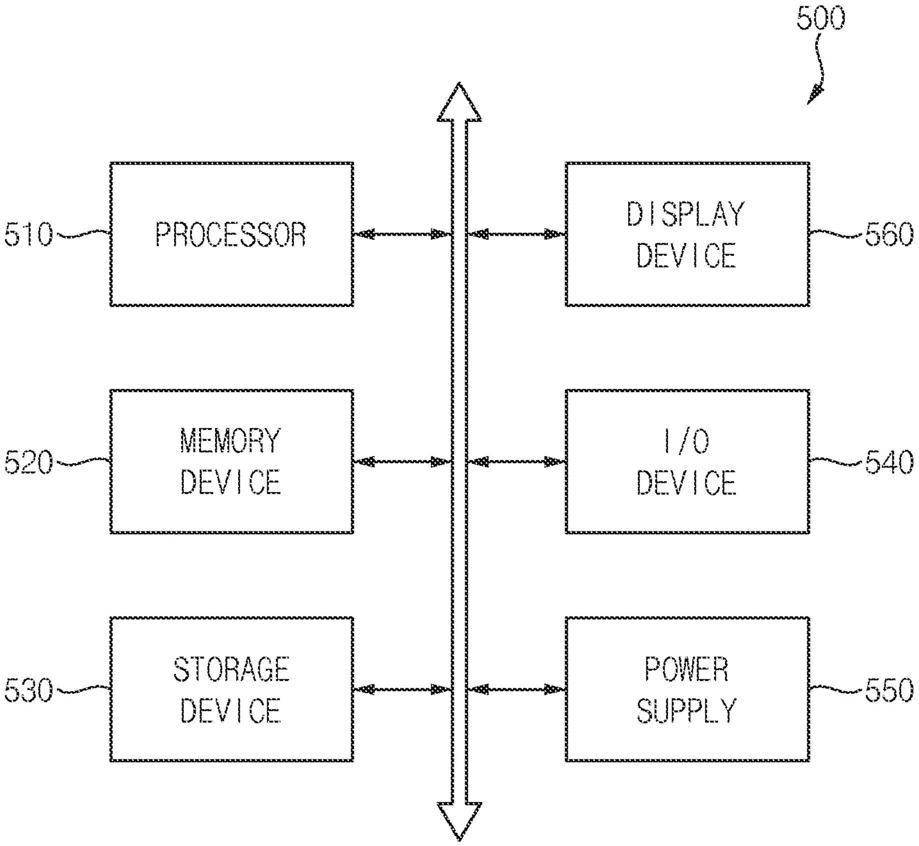
FIG. 15 is a block diagram illustrating an electronic apparatus including a display device according to an embodiment.

FIG. 15 is a block diagram illustrating an electronic apparatus 500 including a display device 560 according to an embodiment.

Referring to FIG. 15, the electronic apparatus 500 may include a processor 510, a memory device 520, a storage device 530, an input/output ("I/O") device 540, a power supply 550, and the display device 560. The display device 560 may correspond to the display device 400 in FIG. 13. The electronic apparatus 500 may further include a plurality of ports for communicating with a video card, a sound card, a memory card, a universal serial bus ("USB") device, etc.

The processor 510 may perform particular calculations or tasks. In an embodiment, the processor 510 may be a microprocessor, a central processing unit ("CPU"), or the like. The processor 510 may be coupled to other components via an address bus, a control bus, a data bus, or the like. In an embodiment, the processor 510 may be coupled to an extended bus such as a peripheral component interconnection ("PCI") bus.

The memory device 520 may store data for operations of the electronic apparatus 1100. In an embodiment, the memory device 520 may include a non-volatile memory device such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, etc., and/or a volatile memory device such as a dynamic random access memory ("DRAM") device, a static random access memory ("SRAM") device, a mobile DRAM device, etc.

The storage device 530 may include a solid state drive ("SSD") device, a hard disk drive ("HDD") device, a CD-ROM device, or the like. The I/O device 540 may include an input device such as a keyboard, a keypad, a touchpad, a touch-screen, a mouse device, etc., and an output device such as a speaker, a printer, etc. The power supply 550 may supply a power for the operation of the electronic apparatus 500. The display device 560 may be coupled to other components via the buses or other communication links.

In the display device 560, each of stages of a scan driver included in the display device 560 may selectively output a scan signal in response to an enable signal, so that the scan driver may provide scan signals with different driving frequencies to variable areas of a display panel, and power consumption of the display device 560 may be effectively reduced.

The display device according to the embodiments may be applied to a display device included in a computer, a notebook, a mobile phone, a smart phone, a smart pad, a PMP, a PDA, an MP3 player, or the like.

Although the scan drivers and the display devices according to the embodiments have been described with reference to the drawings, the illustrated embodiments are examples, and may be modified and changed by a person having ordinary knowledge in the relevant technical field without departing from the technical spirit described in the following claims.

What is claimed is:

1. A scan driver, comprising:

a plurality of stages each including:

a first node control circuit, which controls a voltage of a first node in response to an input signal, a first clock signal, and a second clock signal;

an inverted carry node control circuit, which controls a voltage of an inverted carry node in response to the voltage of the first node;

a carry output circuit, which outputs a carry signal in response to the voltage of the inverted carry node;

a fourth node control circuit, which controls a voltage of a fourth node in response to the carry signal;

a second node control circuit, which controls a voltage of a second node in response to the carry signal, an enable signal, and the voltage of the inverted carry node;

a third node control circuit, which controls a voltage of a third node in response to the voltage of the second node and the voltage of the fourth node; and a scan output circuit, which outputs a scan signal in response to the voltage of the third node and the voltage of the fourth node.

2. The scan driver of claim 1, wherein each of the carry signal and the scan signal is an active high signal having a high level as an active level.

3. The scan driver of claim 1, wherein the second node control circuit controls the voltage of the second node as a low level when the enable signal has a high level before the carry signal having the high level is output, wherein the third node control circuit controls the voltage of the third node as the low level in response to the voltage of the second node having the low level while the carry signal having the high level is output, and wherein the scan output circuit outputs the scan signal having the high level in response to the voltage of the third node having the low level while the carry signal having the high level is output.

4. The scan driver of claim 3, wherein the second node control circuit maintains the voltage of the second node as the low level until the carry signal having the high level is terminated when the enable signal changes from the high level to the low level while the carry signal having the high level is output.

5. The scan driver of claim 1, wherein the second node control circuit controls the voltage of the second node as a high level when the enable signal has a low level before the carry signal having the high level is output, wherein the third node control circuit controls the voltage of the third node as the high level in response to the voltage of the second node having the high level while the carry signal having the high level is output, and wherein the scan output circuit outputs the scan signal having the low level in response to the voltage of the third node having the high level while the carry signal having the high level is output.

6. The scan driver of claim 5, wherein the second node control circuit maintains the voltage of the second node as the high level until the carry signal having the high level is terminated when the enable signal changes from the low level to the high level while the carry signal having the high level is output.

7. The scan driver of claim 1, wherein the second node control circuit maintains the voltage of the second node as a previous level while the carry signal having a high level and the voltage of the inverted carry node having a low level are output.

8. The scan driver of claim 1, wherein the second node control circuit controls the voltage of the second node as a low level when the carry signal having a high level is not output and the enable signal has the high level, and wherein the second node control circuit controls the voltage of the second node as the high level when the carry signal having the high level is not output and the enable signal has the low level.

9. The scan driver of claim 1, wherein the second node control circuit includes:

ninth and tenth transistors connected in series between a high gate voltage line and the second node; and eleventh and twelfth transistors connected in series between the second node and a low gate voltage line, wherein the ninth transistor is turned-on in response to the carry signal, wherein the tenth transistor is turned-on in response to the enable signal having a low level, wherein the eleventh transistor is turned-on in response to the enable signal having a high level, and wherein the twelfth transistor is turned-on in response to the voltage of the inverted carry node.

10. The scan driver of claim 9, wherein the second node control circuit further includes a second capacitor connected between the second node and the low gate voltage line.

11. The scan driver of claim 1, wherein the third node control circuit separates the third node from the fourth node when the voltage of the second node has a high level, and wherein the third node control circuit connects the third node to the fourth node when the voltage of the second node has a low level.

12. The scan driver of claim 1, wherein the fourth node control circuit includes:

a seventh transistor connected between a high gate voltage line and the fourth node and which includes a gate for receiving the carry signal; and an eighth transistor connected between the fourth node and a low gate voltage line and which includes a gate for receiving the carry signal.

13. The scan driver of claim 1, wherein the carry output circuit includes:

a fifth transistor connected between a high gate voltage line and a carry output node for outputting the carry signal and which includes a gate connected to the inverted carry node; and a sixth transistor connected between the carry output node and a low gate voltage line and which includes a gate connected to the inverted carry node.

14. The scan driver of claim 1, wherein the scan output circuit includes:

a fifteenth transistor connected between a high gate voltage line and a scan output node for outputting the scan signal and which includes a gate connected to the third node; and a sixteenth transistor connected between the scan output node and a low gate voltage line and which includes a gate connected to the fourth node.

15. The scan driver of claim 1, wherein each of the first node control circuit, the inverted carry node control circuit, the carry output circuit, the fourth node control circuit, the second node control circuit, the third node control circuit, and the scan output circuit includes at least one P-type transistor and at least one N-type transistor.

16. A scan driver, comprising:

a plurality of stages each including:

a first node control circuit, which controls a voltage of a first node in response to an input signal, a first clock signal, and a second clock signal;

an inverted carry node control circuit, which controls a voltage of an inverted carry node in response to the voltage of the first node;

a carry output circuit, which outputs a carry signal in response to the voltage of the inverted carry node;

a second node control circuit, which controls a voltage of a second node in response to the voltage of the inverted carry node, an enable signal, and the carry signal;

a third node control circuit, which controls a voltage of a third node in response to the voltage of the second node and the carry signal; and a scan output circuit, which outputs a scan signal in response to the voltage of the third node and the voltage of the carry signal.

17. The scan driver of claim 16, wherein the carry signal is an active low signal having a low level as an active level, and wherein the scan signal is an active high signal having a high level as the active level.

18. A display device, comprising:

a display panel, which includes a plurality of pixels;

a data driver, which provides a data signal to each of the plurality of pixels; and a scan driver, which provides a scan signal to each of the plurality of pixels and includes a plurality of stages, wherein each of the plurality of stages includes:

a first node control circuit, which controls a voltage of a first node in response to an input signal, a first clock signal, and a second clock signal;

an inverted carry node control circuit, which controls a voltage of an inverted carry node in response to the voltage of the first node;

a carry output circuit, which outputs a carry signal in response to the voltage of the inverted carry node;

a fourth node control circuit, which controls a voltage of a fourth node in response to the carry signal;

a second node control circuit, which controls a voltage of a second node in response to the carry signal, an enable signal, and the voltage of the inverted carry node;

a third node control circuit, which controls a voltage of a third node in response to the voltage of the second node and the voltage of the fourth node; and a scan output circuit, which outputs a scan signal in response to the voltage of the third node and the voltage of the fourth node.

19. The display device of claim 18, wherein each of the plurality of pixels includes:

a light emitting diode;

a driving transistor connected between a first pixel node and a second pixel node and which controls a driving current provided to the light emitting diode in response to a voltage of a third pixel node;

a write transistor connected between a data line for transmitting the data signal and the first pixel node and turned-on in response to a write gate signal;

a compensation transistor connected between the second pixel node and the third pixel node and turned-on in response to a compensation gate signal; and an initialization transistor connected between an initialization voltage line for transmitting an initialization voltage and the third pixel node and turned-on in response to an initialization gate signal.

20. The display device of claim 19, wherein the scan signal is the compensation gate signal or the initialization gate signal.

* * * * *